(12) United States Patent
Low et al.

(10) Patent No.: US 11,453,492 B2
(45) Date of Patent: Sep. 27, 2022

(54) TRANSFORMABLE HOVERING ROTORCRAFT

(71) Applicant: Singapore University Of Technology And Design, Singapore (SG)

(72) Inventors: Jun En Low, Singapore (SG); Thura Win Luke Soe, Singapore (SG); Chee How Tan, Singapore (SG); Danial Sufiyan Bin Shaiful, Singapore (SG); Shaohui Foong, Singapore (SG); Gim Song Soh, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 457 days.

(21) Appl. No.: 16/484,830

(22) PCT Filed: Feb. 12, 2018

(86) PCT No.: PCT/SG2018/050063
§ 371 (c)(1),
(2) Date: Aug. 9, 2019

(87) PCT Pub. No.: WO2018/147810
PCT Pub. Date: Aug. 16, 2018

(65) Prior Publication Data
US 2019/0382104 A1    Dec. 19, 2019

(30) Foreign Application Priority Data
Feb. 10, 2017 (SG) .............................. 10201701102T

(51) Int. Cl.
*B64C 29/02* (2006.01)
*B64C 39/02* (2006.01)

(52) U.S. Cl.
CPC ............ *B64C 29/02* (2013.01); *B64C 39/024* (2013.01); *B64C 2201/028* (2013.01); *B64C 2201/10* (2013.01); *B64C 2201/18* (2013.01)

(58) Field of Classification Search
CPC ..... B64C 29/02; B64C 29/0033; B64C 39/10; B64C 3/38; B64C 2201/088; B64C 2201/028; B64C 2201/18; B64C 2201/102
See application file for complete search history.

(56) References Cited

U.S. PATENT DOCUMENTS

| | | | | |
|---|---|---|---|---|
| 2,479,125 A | * | 8/1949 | Leonard .............. | B64C 29/0075 244/102 R |
| 9,085,354 B1 | * | 7/2015 | Peeters ................... | B64C 29/02 |

(Continued)

FOREIGN PATENT DOCUMENTS

| | | |
|---|---|---|
| CN | 105836121 A | 8/2016 |
| WO | 2014177591 A1 | 11/2014 |
| WO | 2017072519 A1 | 5/2017 |

OTHER PUBLICATIONS

International Search Report based on International Application No. PCT/SG2018/050063, dated Apr. 11, 2018, 4 pages (for reference purpose only).

(Continued)

*Primary Examiner* — Tye William Abell
(74) *Attorney, Agent, or Firm* — Viering, Jentschura & Partner MBB

(57) ABSTRACT

An aircraft including: a pair of wings rotatably coupled to opposing lateral sides of the fuselage and being rotatable relative to each other; a pair of servo motors, each connected to a corresponding wing and configured to rotate the corresponding wing in two rotational directions; a pair of thrust motors, each of which mounted on a corresponding wing; and a flight controller connected to the servo motors and to (Continued)

the thrust motors, and configured to control each servo motor and each thrust motor, such that the aircraft can be selectively operated in a cruising mode, such that the pair of wings are in a non-permanent-rotation-state about a yawing axis which extends at least substantially through the center of gravity, and a monocopter mode, in which the pair of thrust motors provide thrust in opposite directions so that the pair of wings are in a permanent-rotation-state about the yawing axis.

17 Claims, 9 Drawing Sheets

(56) References Cited

U.S. PATENT DOCUMENTS

| | | | | |
|---|---|---|---|---|
| 2008/0223994 | A1* | 9/2008 | Greenley | A63H 27/02 |
| | | | | 244/7 R |
| 2010/0025543 | A1* | 2/2010 | Kinsey | B64C 39/024 |
| | | | | 244/7 A |
| 2012/0248259 | A1* | 10/2012 | Page | B64C 39/024 |
| | | | | 244/7 B |
| 2013/0162761 | A1* | 6/2013 | Goldemann | H04N 5/23238 |
| | | | | 348/36 |
| 2014/0008498 | A1* | 1/2014 | Reiter | B64C 29/00 |
| | | | | 244/99.11 |
| 2015/0028155 | A1* | 1/2015 | Reiter | B64C 3/385 |
| | | | | 244/39 |
| 2018/0370624 | A1* | 12/2018 | Seale | B64C 27/18 |
| 2019/0061935 | A1* | 2/2019 | Wright | B64C 29/02 |

OTHER PUBLICATIONS

T.J.Mueller; "Fixed and Flapping Wing Aerodynamics for Micro Air Vehicle Applications"; chapter 11; 2001; 10 pages; vol. 195; American Institute of Aeronautics and Astronautics, Inc.

A. Kellas; "The Guided Samara: Design and Development of a Controllable Single-Bladed Autorotating Vehicle" Sep. 2007; Department of Aeronautics and Astronautics; p. 1-110; Massachusetts Institute of Technology.

J. Houghton et al.; "Fly-by-wire Control of a Monocopter"; ResearchGate; May 2008; 37 pages; Massachusetts Institute of Technology, Boston; Experimental Projects II Tech.

E.R. Ulrich et al; "From falling to flying: the path to powered flight of a robotic samara nano air vehicle"; IOP Publishing; Nov. 24, 2010; 17 Pages; University of Maryland, College Park, MD.

K. Fregene et al; "Dynamics and Control of a Biomimetic Single-Wing Nano Air Vehicle"; 2010 American Control Conference; June 30-Jul. 2, 2010; pp. 51-56; Marriott Waterfront, Baltimore, MD, USA.

J.D. Anderson; "Fundamentals in Aerodynamics"; Chapters 4.7 and 5.3; The McGraw-Hill Company; 2011; 41 pages; University of Maryland.

M. Bangura et al.; "Nonlinear Dynamic Modeling for High Performance Control of a Quadrotor"; Proceedings of Australasian Conference on Robotics and Automation Victoria University of Wellington, New Zealand., Dec. 3-5, 2012; 10 pages; Australian National University, Canberra, Australia.

J. G. Leishman, "Principles of Helicopter Aerodynamics"; Cambridge University Press 2019; Dec. 2016; 2 pages: 2nd Edition; of Maryland, College Park.

R.W. Prouty; "Helicopter performance, stability, and control"; Chapter 9; Krieger Publishing Company P.O. Box 9542 Melbourne, FL United States 32902-9542; 1995; 97 pages.

T. Luukkonen; "Modelling and control of quadcopter"; Independent research project in applied mathematics Espoo, Aug. 22, 2011; 26 pages; Aalto University School of Science.

F.A. Administration; "Flight Training Handbook"; retrieved from: avstop.com/ac/flighttrainghandbook/chapter17.html 1/; Aviation Book co; 1980; Chapter 17; Oklahoma City, OK.

Y.H.P. Jun En Lowet al.; "Analysis of Wing Twist Effects on Hover Flight Dynamics of a Single Rotor Aerial Craft"; 2016 IEEE International Conference on Advanced Intelligent Mechatronics (AIM)Banff, Alberta, Canada, Jul. 12-15, 2016; pp. 323-328; Banff, Alberta, Canada.

E.R.Ulrich et al.: "Control Model for Robotic Samara: Dynamics About a Coordinated Helical Turn"; Journal of American Control Conference, Baltimore; Nov.-Dec. 2010; vol. 33, No. 6; 6 pages; Singapore University.

R. Åke Norberg; "Autorotation, self-stability, and structure of single-winged fruits and seeds (samaras) with comparative remarks on animal flight"; Biolog. Rev.; vol. 48; Issue 4; pp. 561-596, Apr. 3, 1973.

K. Nickel et al.; "Tailless Aircraft"; Butterworth-Heinemann; Sep. 1, 1994; 4 pages; the American Institute of Aeronautics and Astronautics, Inc.

A. Valiyff et al.; "An Investigation into the Aerodynamic Efficiency of Tailless Aircraft"; 47th AIAA Aerospace Sciences Meeting Including the New Horizons Forum and Aerospace Exposition Jan. 5-8, 2009, Orlando, Florida 9 pages; American Institute of Aeronautics and Astronautics.

J.B. Brandt et al.; "Propeller Performance Data at Low Reynolds Numbers"; 49th AIAA Aerospace Sciences Meeting AIAA 2011-1255 Jan. 4-7, 2011, Orlando, FL; 18 pages; American Institute of Aeronautics and Astronautics.

G. Matic et al.; "Mathematical Model of a Monocopter Based on Unsteady Blade-Element Momentum Theory" Journal Ofaircraft; Nov.-Dec. 2015; 10 pages; vol. 52, No. 6; Singapore University.

R.H. Liebeck; "Design of the BlendedWing Body Subsonic Transport"; Journal of Aircraft; Jan.-Feb. 2004; vol. 41, No. 1, 29 pages; The Boeing Company, Huntington Beach, California 92647.

DHL; "DHL Parcelcopter"; Jan. to Mar. 2016; 2 pages.

X plusOne Drone; "Mind-Blowing Speed" (http://xcraft.io); 2017 Xcraft Inc. Made in Idaho.

James Ryan Burgess (CEO); "Project Wing"; X Development LLC; 2017; 4 pages.

Hochstenbach et al.; "Design and control of an unmanned aerial vehicle for autonomous parcel delivery with transition from vertical take-off to forward flight"; International Journal of Micro Air Vehicles; 2015; 10 pages; https://doi.org/10.1260/1756-8293.7.4.395.

Amazon Prime Air; retrieved from: https://www.amazon.com/Amazon-Prime-Air/b?ie=UTF8&node=8037720011.

Low et al.; "Design and Dynamic Analysis of a Transformable HOvering Rotorcraft"; IEEE International Conference on Robotics and Automation (ICRA); Jun. 3, 2017; 8 pages.

\* cited by examiner

TRANSFORMABLE HOVERING ROTORCRAFT

CROSS-REFERENCE TO RELATED APPLICATIONS

This is a national phase application that claims the benefit of Patent Cooperation Treaty Application PCT/SG2018/050063, filed on Feb. 12, 2018, which claims the benefit of Singapore Patent Application number 10201701102T filed 10 Feb. 2017, the entire contents of which are incorporated herein by reference for all purposes.

TECHNICAL FIELD

Various embodiments relate to aircraft.

BACKGROUND

In general, there are three distinct design categories in the field of Unmanned Aerial Vehicles (UAVs); fixed-wing aircraft, rotary-wing aircraft and flapping-wing aircraft. Each category has a fundamental use case that the other two cannot outperform it in. For example, fixed-wing aircraft are useful for their long range and relatively high forward flying speeds while rotary-wing aircraft are useful in their ability to hover and operate in tight spaces. Given the complementary fundamental use cases of fixed-wing aircraft and rotary-wing aircraft, a hybrid UAV combining their features may provide an operator with the flexibility to operate in a wide range of scenarios. One hybrid UAV design approach may be to fuse multiple rotors onto a fixed-wing airframe, for example, as seen in the QuadRanger Vertical Take Off and Landing (VTOL) UAV. Another design approach may be to share parts of the propulsion systems and/or control surfaces between the fixed-wing and rotary-wing flight modes by rotating the propulsion systems and/or the control surfaces, as seen in BirdsEyeView's FireFLY6. Another approach may be to rotate the entire aircraft, for example as seen in Google's Project Wing. Each of the abovementioned design approaches involves inefficiencies or redundancies in at least one of the flight modes.

SUMMARY

According to various embodiments, there may be provided an aircraft including: a fuselage defining a body frame with longitudinal, lateral and height axes extending perpendicular to each other and intersecting in a center of gravity of the aircraft; a pair of wings rotatably coupled, at wing roots, to opposing lateral sides of the fuselage, the pair of wings being rotatable relative to each other about a rotational axis which is at least substantially parallel to the lateral axis, and each wing having an airfoil with a leading edge and a chord; a pair of servo motors, each of which connected to a corresponding wing and configured to rotate the corresponding wing about its rotational axis in two rotational directions; a pair of thrust motors, each of which mounted on a corresponding wing and configured to provide a thrust in a leading direction of the airfoil of the corresponding wing; and a flight controller connected to the servo motors and to the thrust motors, and configured to control each servo motor and each thrust motor, wherein each servo motor is able to rotate the corresponding wing about the rotational axis within such a rotational range that the aircraft can be selectively operated in a cruising mode, in which the pair of thrust motors provide thrust in a common direction so that the pair of wings are in a non-permanent-rotation-state about a yawing axis which is at least substantially perpendicular to the lateral axis and which extends at least substantially through the center of gravity, and a monocopter mode, in which the pair of thrust motors provide thrust in opposite directions so that the pair of wings are in a permanent-rotation-state about the yawing axis.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various embodiments are described with reference to the following drawings, in which.

DETAILED DESCRIPTION

Figure 1:
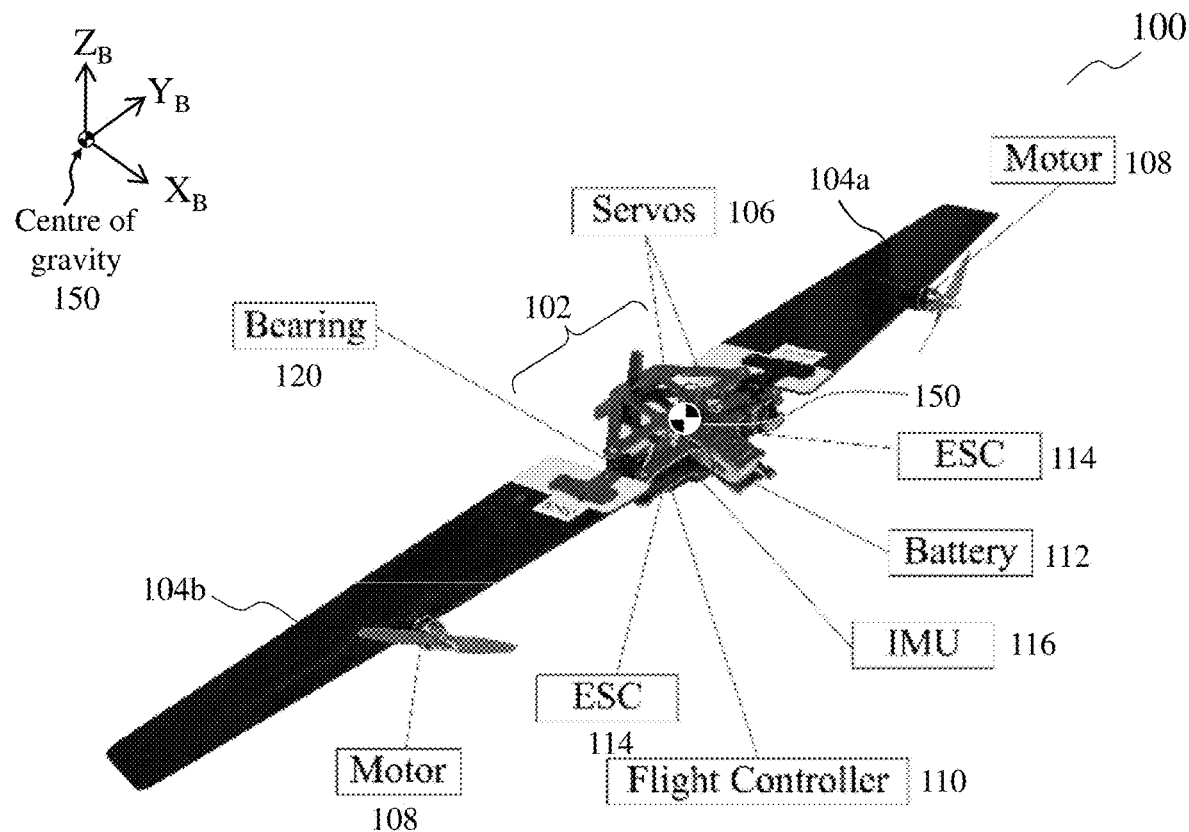
FIG. 1 shows an aircraft in a cruising mode, according to various embodiments.

It will be understood that any property described herein for a specific aircraft may also hold for any aircraft described herein. Furthermore, it will be understood that for any aircraft described herein, not necessarily all the components described must be enclosed in the aircraft, but only some (but not all) components may be enclosed. Furthermore, it will be understood that the embodiments described below may be combined, for example, a part of one embodiment may be combined with a part of another embodiment.

In this context, the aircraft as described in this description may include a memory which is for example used in the processing carried out in the aircraft. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "controller" may be understood as any kind of a logic implementing entity, which may be special purpose circuitry or a processor executing software stored in a memory, firmware, or any combination thereof. Thus, in an embodiment, a "controller" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "controller" may also be a processor executing software, e.g. any kind of computer program, e.g. a computer program using a virtual machine code such as e.g. Java. Any other kind of implementation of the respective functions which will be described in more detail below may also be understood as a "controller" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices form part of the common general knowledge in any country.

In order that the disclosure may be readily understood and put into practical effect, various embodiments will now be described by way of examples and not limitations, and with reference to the figures.

In the context of various embodiments, "thrust motor" may be but is not limited to being interchangeably referred to as "propulsion system" or "aircraft engine".

According to various embodiments, an aircraft that may be selectively operated in a first flight mode or a second flight mode, may be provided. In the first flight mode, also referred herein as the cruising mode, or "C-MOD", the aircraft may fly like a fixed wing aircraft or a horizontal flying platform. In the cruising mode, the aircraft may achieve the advantages of a fixed-wing aircraft, for example, the ability to fly forward at a relatively high speed, and for a long range. In the second flight mode, also referred herein as the monocopter mode or the hovering mode or "H-MOD", the aircraft may achieve the advantages of a rotary-wing aircraft, for example, the ability to hover and the ability to maneuver in tight spaces. Unlike conventional fixed-wing aircraft, the aircraft may exclude ailerons. Instead of ailerons, the wings of the aircraft may be rotatable about a lateral axis at least substantially parallel to a line connecting the tips of the wings, so that the wings may directly serve as control surfaces. The wings may be rotatable using at least one servo motor. The aircraft may include at least one servo motor mounted near a root chord of each wing to control the rotation of the corresponding wing. Alternatively, the aircraft may use just one servo motor connected to both wings via a transmission to thereby simultaneously rotate the wings in opposite directions. Each wing may also have a respective flap that serves as the ailerons of the aircraft. Also, an equal number of propulsion systems may be mounted on each wing, such that the direction of thrust generated by the propulsion systems may be altered by rotating the wings. The propulsion systems may be mounted in a forward direction on each wing. By virtue of being operable to rotate the wings, the servo motors also control the directions of both the thrust and lift force of the aircraft.

According to various embodiments, the aircraft may include a fuselage, a pair of wings, a pair of servo motors and a pair of thrust motors. The pair of wings, the pair of servo motors and the pair of thrust motors may be arranged symmetrically about a longitudinal axis of the fuselage. Each servo motor may be coupled between the fuselage and a respective wing. The aircraft may include at least one more servo motor to improve the control capability of the aircraft. The aircraft may also include additional flaps for aileron control. Each thrust motor may be coupled to a respective wing. The pair of wings may serve as the lift-generating surfaces, as well as the control surfaces of the aircraft. The servo motors may serve as the control system of the aircraft. The thrust motors may serve as the means of propulsion for the aircraft. For aerodynamic efficiency, the aircraft may have a tailless structure as the tail would not be able to serve as an aerodynamic surface in the monocopter mode. Alternatively, the aircraft may have a retractable tail. The tail may be extended when the aircraft is operating in the cruising mode, so as to stabilize the pitch and yaw of the aircraft. The tail may be retracted into the fuselage when the aircraft is operating in the monocopter mode, to reduce drag force.

According to various embodiments, the aircraft may include a payload, for example a camera or other types of data collection sensors. In transiting between the cruising and monocopter flight modes, the aircraft may rotate its entire frame. The payload may also be mounted onto the fuselage which may be rotated between the flight modes, to an orientation that may minimize drag force in the selected flight mode. The aircraft may include gimbals to compensate for the rotation of the airframe or the fuselage, such that the payload may have fixed frame of reference relative to the Earth. The aircraft may also include a compensation processor that computes the rotation required by the gimbals, based on the flight telemetry of the aircraft.

FIG. 1 shows an aircraft 100 in a cruising mode, according to various embodiments. The aircraft 100 may include a fuselage 102. To facilitate description of the orientations and positions of the aircraft components, the fuselage 102 is referred to as defining a body frame. The body frame has a longitudinal axis $X_B$, a lateral axis $Y_B$ and a height axis $Z_B$. Each of $X_B$, $Y_B$ and $Z_B$ extend perpendicular to each other and they intersect in a centre of gravity 150 of the aircraft 100. For clarity in the figure, the body frame and its axes are shown outside of the aircraft 100, although it should be understood that the axes $X_B$, $Y_B$ and $Z_B$ extend from the centre of gravity 150 which lies in the fuselage 102. The fuselage 102 may be attached to a pair of wings 104 including a first wing 104a and a second wing 104b. Each wing has an airfoil that may function as an aerodynamic control surface. The airfoil will be described in further details with respect to FIG. 4. The first wing 104a may be rotatably attached to a first lateral side of the fuselage 102, while a second wing 104b may be rotatably attached to an opposing second lateral side of the fuselage 102. The first wing 104a may be the left wing, also referred herein as the port wing. The second wing 104b may be the right wing, also referred herein as the starboard wing. Each of the first wing 104a and the second wing 104b may have a respective thrust motor 108 mounted on the wing. The thrust motor 108 may be mounted proximal, or along a peripheral of, the leading edge of the wing. Each thrust motor 108 may include a propeller. The propeller may include at least one propeller blade. The at least one propeller blade may rotate about a central propeller axis parallel to the leading direction of the airfoil. Each wing may be rotatably attached to the fuselage 102 via a corresponding servo motor 106. Each servo motor 106 may be capable of rotating in both clockwise and anti-clockwise directions. The aircraft 100 may further include components such as a flight controller 110, a battery 112, an electronic speed control (ESC) 114, an inertial measurement unit (IMU) 116 and bearings 116. These components may be housed in, or mounted on, the fuselage 102. At least some of these components may alternatively be mounted on the wings 104 provided that they do not detrimentally affect the centre of gravity and aerodynamic profile of the aircraft 100. These components will be described in further detail in relation to FIG. 3. In the cruising mode, the wings 104 may be aligned such that the thrust motors 108 on the corresponding wings 104 are facing a generally common direction so that the pair of wings 104 are in a non-permanent-rotation state about a yawing axis. The yawing axis may be at least substantially perpendicular to the lateral axis $Y_B$ and may extend in a plane defined by the longitudinal axis $X_B$ and the height axis $Z_B$. The yawing axis may extend at least substantially through the centre of gravity 150 of the aircraft 100. In the non-permanent-rotation state, the pair of wings 104 may rotate about the yawing axis from time to time when the aircraft 100 yaws, in other words, makes a turn in its flight trajectory, but the pair of wings 104 do not continuously rotate about the yawing axis. In the cruising mode, in order for the aircraft 100 to yaw, the thrust motors 108 may each generate a different thrust output so as to provide differential thrust between the thrust motors 108. As a result, the aircraft may move at least substantially parallel to the common direction. The yawing axis may be collinear with the height axis $Z_B$.

Figure 2:
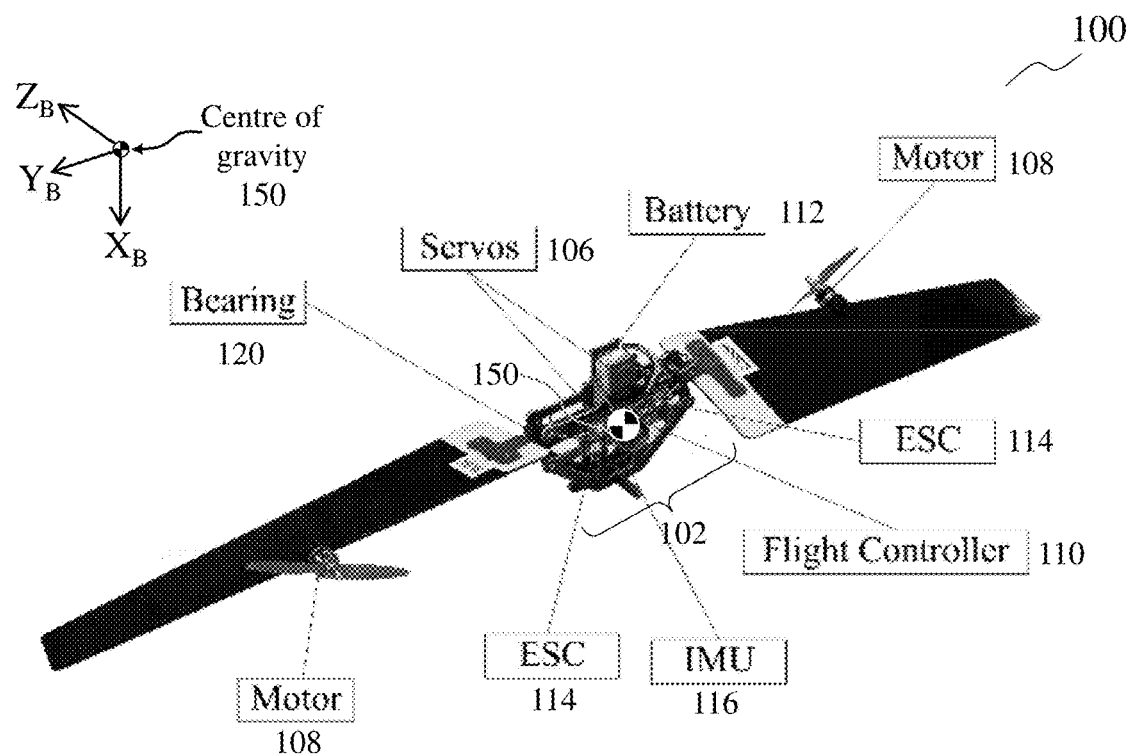
FIG. 2 shows the aircraft in a monocopter mode.

FIG. 2 shows the aircraft 100 in a monocopter mode. In the monocopter mode, the wings 104 may be rotated such that the thrust motors 108 on the corresponding wings 104 are facing at least substantially opposite directions. As a result, the wings 104 may function as a single-axis rotor to rotate about the yawing axis in a permanent-rotation state. In the permanent-rotation state, the wings 104 may continuously rotate about the yawing axis. The fuselage 102 may also spin about the yawing axis. The yawing axis may be collinear with the height axis $Z_B$, or may be collinear with the longitudinal axis $X_B$ if the fuselage 102 is rotated at least substantially perpendicular to the chords of the wings 104. The entire aircraft 100 may spin to generate lift. In other words, the aircraft may operate as a multi-winged monocopter. The aircraft 100 may be structurally efficient in the monocopter mode since its entire airframe is dedicated to the generation of lift. Also, the attitude of the aircraft 100 in the monocopter mode may be passively stable, thereby requiring minimal control to maintain a steady state hover. In summary, the aircraft 100 may fully utilize all its aerodynamic surfaces, namely the wings 104, to generate lift in both the cruising mode and the monocopter mode. Also, the aircraft 100 may fully utilize its control system, i.e. the servo motors, as well as its propulsion systems, in both the cruising and the monocopter flight modes. Therefore, the aircraft 100 may achieve the capabilities of both cruising and hovering using the same aircraft frame in a structurally efficient manner. The aircraft 100 may be an under-actuated system that can achieve controllability in 4 degrees of freedom (DOF) in the cruising mode and can achieve controllability in 5 DOF in the monocopter mode. The aircraft 100 may be able to transition between the flight modes repeatedly without the need for any additional control systems.

Figure 3:
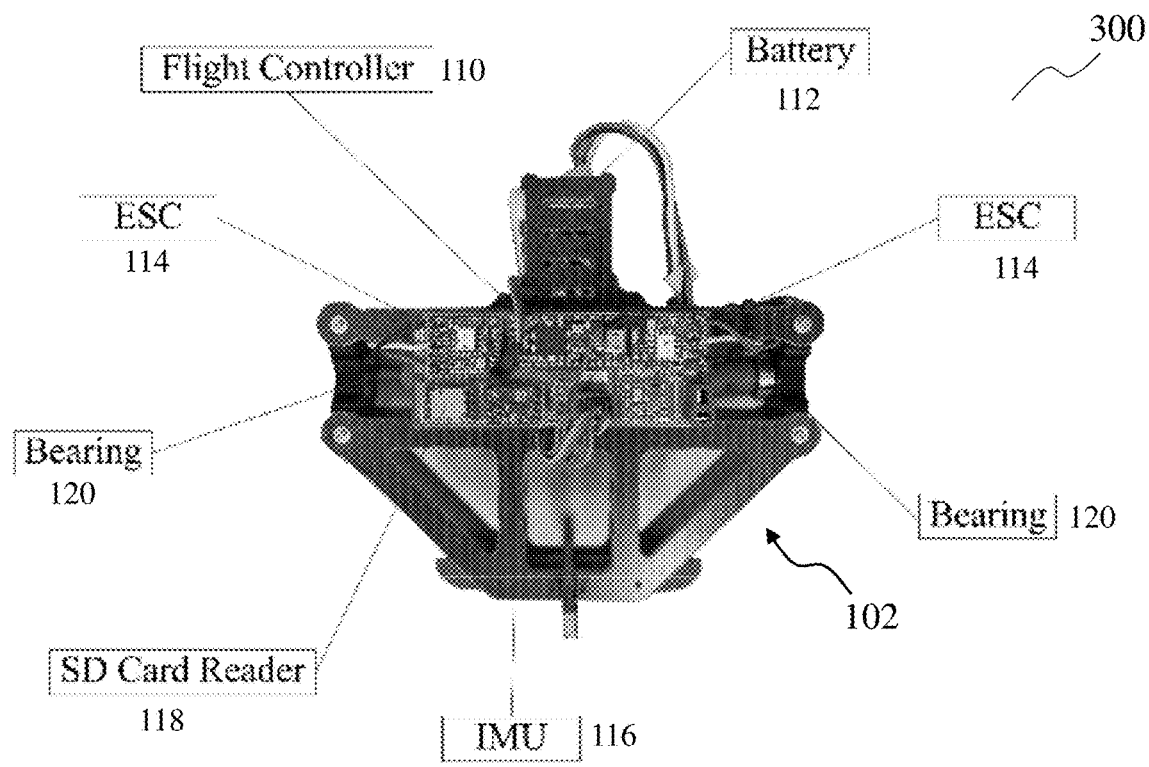
FIG. 3 shows a bottom plan view of a fuselage according to various embodiments.

FIG. 3 shows a bottom plan view 300 of a fuselage 102 according to various embodiments. The bottom plan view 300 also shows a plurality of electronic components that may be mounted onto, or enclosed within, the fuselage 102. These electronic components may include at least one of: the flight controller 110, the battery 112, the electronic speed control (ESC) 114, the inertial measurement unit (IMU) 116, the bearings 116, and a card reader 118. The flight controller 110 may be a processor. The flight controller 110 may be connected to the servo motors 106 and to the thrust motors 108. The flight controller 110 may control the pair of servo motors 106, either jointly or individually. The flight controller 110 may also control the pair of thrust motors 108, either jointly or individually. In addition, the flight controller 110 may also be connected to the IMU 116 and the ESC 114. The flight controller 110 may control the servo motors 106 and the thrust motors 108 based on data received from the IMU 116 and the ESC 114. The flight controller 110 may also receive command messages from a datalink system and may control the servo motors 106 and/or the thrust motors 108 based on the command messages. The aircraft 100 may include a pair of bearings 120. Each bearing 120 may serve as a connecting part or joint between a servo motor 106 and its corresponding wing 104. The bearing 120 may be mechanically coupled at one end to the servo motor 106, and coupled at an opposing end to the corresponding wing 104. The bearing 120 may transfer the rotational momentum of the servo motor 106 to the corresponding wing 104. The battery 112 may provide electrical energy to all of the electronic components in the aircraft 100. In other words, the battery 112 may power the aircraft 100. The battery 112 may be for example, a lithium-ion battery, and may be a rechargeable battery. The ESC 114 may be an electronic circuit. The ESC 114 may control and regulate the speed of the thrust motors 108 based on flight commands input by the pilot. For propeller-based thrust motors 108, the ESC 114 may control the revolution rate of the propeller blades of the thrust motors 108. The IMU 116 may be a sensor configured to sense inertial measurements, including pitch, roll and yaw. The IMU 116 may be mounted to the fuselage 102 so that it measures the pitch, roll and yaw of the fuselage 102. The IMU 116 may include accelerometer(s) for detecting linear acceleration, gyroscope(s) for detect rotational rates, and magnetometer(s) for sensing orientation. The aircraft 100 may also include a barometer configured to measure air pressure and estimate the altitude of the aircraft 100 based on the measured air pressure. The aircraft 100 may also include an Inertial Navigation System (INS). The INS may receive measurements from the IMU 116 to compute at least one of: attitude, angular rates, linear velocity, and position of the aircraft 100 relative to a global reference frame. The IMU 116 may also be implemented as part of the INS. The aircraft 100 may further include a Global Positioning System (GPS) or other navigation satellite systems, for detecting the position of the aircraft 100 with respect to the Earth. The card reader 118 may serve as an onboard data logger. The card reader 118 may be configured to receive, read and write to a digital media such as a secure digital (SD) card or other types of memory cards. The card reader 118 may be communicatively coupled to at least one of: the flight controller 110, the IMU 116, and the other electronic components. The card reader 118 may record flight telemetry from the flight controller 110. The card reader 118 may also record measurements from the IMU 116. The card reader 118 may also record test data or maintenance data including operation status and error messages from the plurality of electronic components. The aircraft 100 may further include a radio transceiver or a datalink system. The radio transceiver may be configured to receive command messages which it may then relay to the flight controller 110. The command messages may include information on the desired flight path or flight parameters. The radio transceiver may also be configured to transmit data such as flight telemetry data or payload data, from the aircraft 100 to a user interface that is external to the aircraft 100.

Figure 4A:
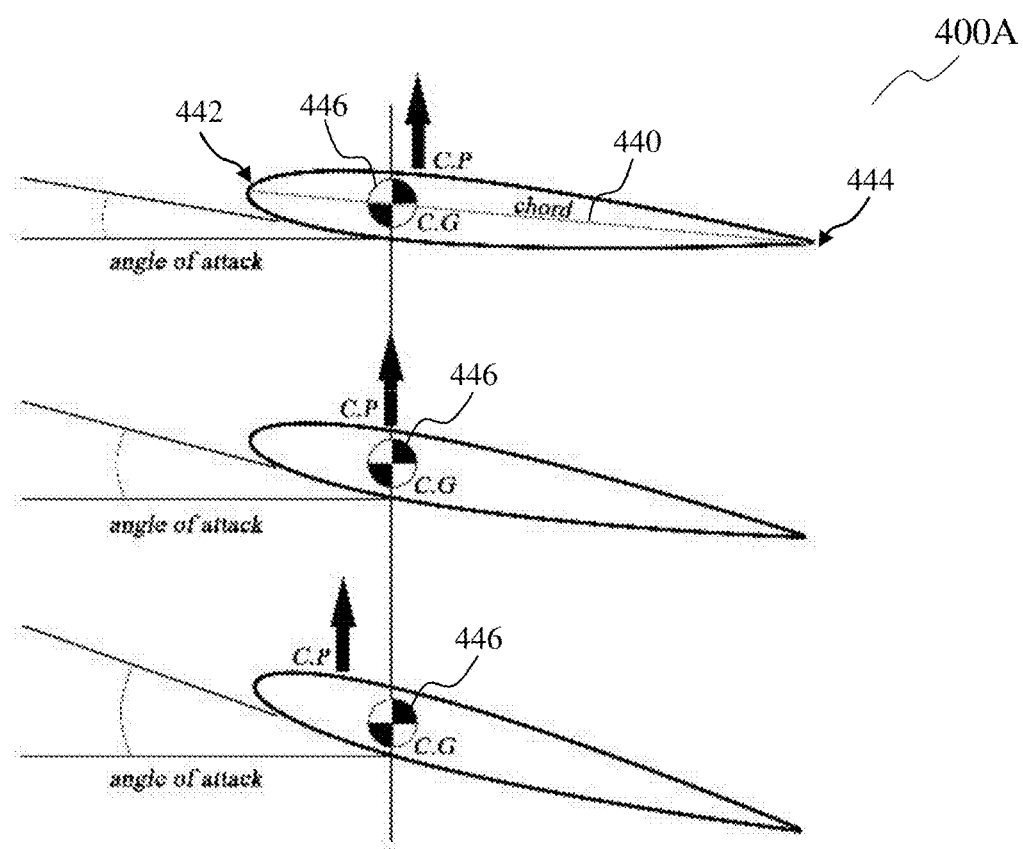
FIG. 4A shows cross-sectional diagrams of an airfoil, illustrating how the centre of pressure of the airfoil shifts with respect to increasing angle of attack.

FIG. 4A shows cross-sectional diagrams 400A of an airfoil, illustrating how the centre of pressure (C.P.) of the airfoil shifts with respect to increasing angle of attack. Each wing 104 has an airfoil which produces an aerodynamic force as it moves through air. The airfoil has a chord 440 extending from the leading edge 442 of the wing to the trailing edge 444 of the wing 104. As shown in the cross-sectional diagrams 400A, the C. P. may shift towards the leading edge 442 and away from the trailing edge 444 as the angle of attack increases. The shift in the C. P. may cause the aerodynamic centre of the wing 104 to shift accordingly. To reduce the shifting effect of the aerodynamic centre when the aircraft 100 is operating in the cruising mode, the airfoil may be designed to be symmetrical about the chord 440. Also, the airfoil may be designed with its centre of gravity 446 placed at a distance approximately a quarter from the leading edge 442 of the airfoil. When the aircraft 100 is operating in the monocopter mode, the aircraft may spin about a yawing axis. It is important to reduce the effects of centrifugal forces on the components of the aircraft 100. Any imbalance along the yawing axis may result in a wobbling of the yawing axis, reducing the efficiency of the monocopter mode and hampering the control of the craft. To reduce the undesirable effects of the centrifugal forces, it may be desirable to distribute the mass of the aircraft 100 such that it is as close as possible to, and symmetrical about the yawing axis. With the simultaneous needs of a forward bias of mass, specifically, to the quarter chord in the cruising mode, and a symmetrical and compact distribution in monocopter mode, it may be useful to place the yawing axis to be collinear to the direction of the cruising mode's forward flight.

To maintain steady flight, the aircraft 100 should be in equilibrium with respect to its centre of mass in both the cruising mode and the monocopter mode. While conventional aircraft may achieve the equilibrium by strategically arranging masses on the aircraft to balance out the aerodynamic forces and torques, such a solution may not be easily applied to the aircraft 100 which operates in two different flight modes having different sources of aerodynamic forces, using the same physical frame. In the cruising mode, the aerodynamic forces are translational; whereas in the monocopter mode, the aerodynamic forces are rotary. A first possible solution may be to design the flight modes such that the equilibrium points on the body frame for both flight modes are nearly equal. Another possible solution may be to implement a component that passively shifts its body frame position depending on the flight mode. Considering that the fundamental equations of motion are deeply rooted in the first solution and to avoid the added complexity of a significant non-rigid mass in both the flight modes and the transition step, the aircraft 100 may adopt the first solution. The aircraft 100 may have a span-wise symmetrical design to maintain roll and yaw equilibrium in the cruising mode. The aircraft 100 may also have all the torques operating about the pitch axis, i.e. the lateral axis $Y_B$, reduced to achieve pitch equilibrium.

To perform an equilibrium analysis on the aircraft 100, the forces and torques contributing to a pitching moment may be resolved to act on three distinct points, the propeller center (P.C.), the aerodynamic center (A.C.) and the center of mass (M.C.), on each wing 104. If all these points were arranged to be collinear to one another on a line, the pitch torque may be taken to be negligible. The pitch axis may be designed to coincide with this line and may stretch from wing tip to wing tip. To align the P.C. to the pitch axis, the thrust motors 108 may be mounted on leading edges of respective wings 104, with their respective central propeller axes parallel to the wing chord. This takes advantage of the positive angle of attack of the wing during operation to keep the propellers cleared from the ground (especially for take-off and landing). Consequently, with the front end loaded with the motor, a leading edge taper is useful as it may improve the lift distribution of each wing and may also balance the mass of the thrust motor 108 such that the M.C. of each wing is on the pitch axis. The wings 104 may each have a symmetrical airfoil to align the A.C. The A.C of each blade element of the wing 104 may be positioned at a quarter chord away from the leading edge with negligible aerodynamic torques. However with the existence of the taper, not every blade element may have its quarter chord point coincident to the pitch axis, thus requiring the dimensions of the wing to be constrained to ensure that the sum A.C. of each wing does remain so.

Figure 4B:
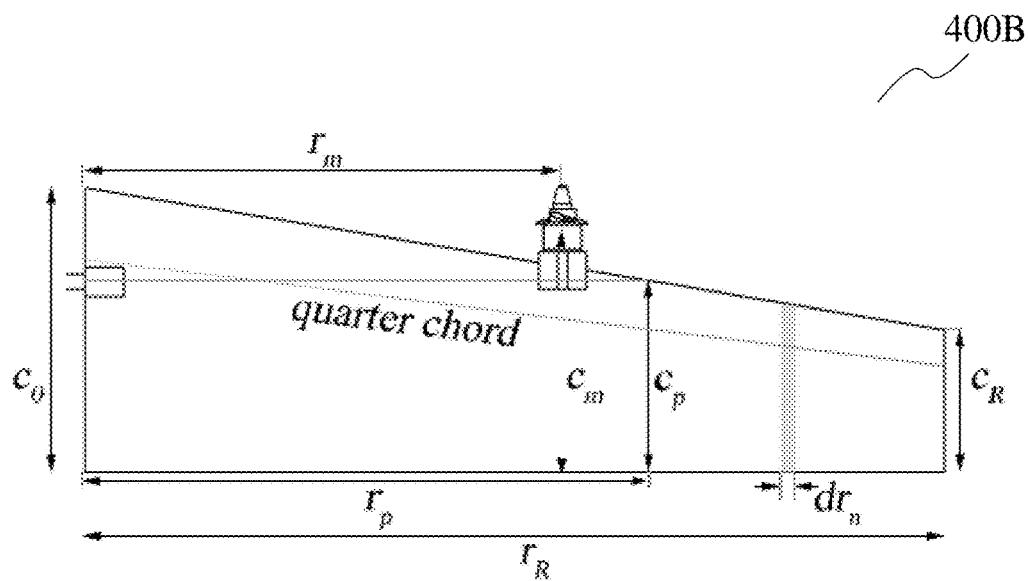
FIG. 4B shows a plan view of a wing according to various embodiments.

FIG. 4B shows a plan view 400B of an airfoil according to various embodiments. For each wing, c represents the chord length and r represents the span-wise distance. Subscript 0 represents the root chord position, subscript m represents motor, subscript p represents pitch axis, and subscript n represents the $n^{th}$ blade element along the wing 104 and subscript R represents wing tip. For each blade element of the wing 104, there are two aerodynamic forces acting on the A.C., a lift force $dL_n$ and a drag force $dD_n$ defined by:

$$dL_n = \tfrac{1}{2}\rho c_n C_l U^2 dr_n \qquad (1)$$

$$dD_n = \tfrac{1}{2}\rho c_n C_d U^2 dr_n \qquad (2)$$

where $\rho$ is the density of air, $C_l$ is the lift coefficient, $C_d$ is the drag coefficient, U is the freestream velocity and dr is the infinitesimal width of the blade element. Using a linear taper, $c_n$ is defined to be the chord length expressed as a function of the span-wise distance:

$$c_n = \left(\frac{c_R - c_0}{r_R} r_n + c_0\right) \qquad (3)$$

Since the flight objective of the cruising mode is to cruise long distances, $\rho$ may be assumed to be constant. Similarly, the freestream velocity may be assumed to be constant across the wing 104 as the aircraft 100 is not expected to conduct highly agile maneuvers in the cruising mode. Lastly, with no wing twist in the cruising mode, the lift and drag coefficients, which are functions of the angle between the freestream velocity vector and blade chord (known as the angle of attack or α), may also be taken as constants across the wing 104. This leaves $c_n$ to be the only span-wise affected component. Thus, for wing aerodynamic forces and masses to give zero torque about the pitch axis:

$$\int_{L_0}^{L_R} s \cdot dL = 0 \quad (4)$$

$$(c_m - c_p)m_m + \int_{r_0}^{r_R} \int_0^{c(r)} [c - c_p] \rho h \, dc \, dr = 0 \quad (5)$$

where s is the torque arm between the blade elements' quarter chord points and the pitch axis. c(r) is the function described in Equation (3) and $m_m$ is the total mass of the thrust motor system. dL may be swapped with dD in Equation (4) to the same effect. The blade element thickness may be approximated to be a constant, h. In other words, the airfoil may be a flat plate airfoil. Through Equations (4) and (5), $c_P$ and $c_m$ are constrained to be:

$$c_P = \frac{c_R^2 + c_R c_0 + c_0^2}{2(c_R + c_0)} \quad (6)$$

$$c_m = \frac{\rho h r_R}{6 m_m}(c_0^2 + 3 c_P c_R - c_R c_0 - c_P c_0 - c_R^2) \quad (7)$$

Hence given a specific wing material, total wing area, wingspan and motor, Equations (6) and (7) may be used to define the position of the pitch axis and the thrust motor 108 relative to the rest of the wing 104 such that its three influential points, the P.C, the M.C. and the A.C., are all collinear. By ensuring the size of the body component (in other words, the fuselage 102) is small relative to the wings 104 and by using a span-wise symmetrical, perforated structure, the aerodynamic contribution of the body may be approximated to be the drag force:

$$D_p = -k_{quad} U^2 - k_{lin} U \quad (8)$$

where $k_{quad}$ and $k_{lin}$ are the drag coefficients. The force acts at the M.C. of the aircraft 100 and parallel to the freestream velocity, U. With the pitch axis set via the wing design, the components on the body are arranged accordingly to ensure that the body component's own M.C. is also at the midpoint of the pitch axis.

When the aircraft 100 operates in the monocopter mode, the aircraft 100 may rotate continuously along its yawing axis. The aircraft 100 needs to achieve pitch and roll equilibrium in order to maintain steady flight in the monocopter mode. Due to the continuous rotation of the aircraft 100, two new factors need to be accounted for, namely centripetal forces and rotor-wing aerodynamics. The centripetal forces may be resolved by placing the yawing axis orthogonal and centered on the pitch axis of the aircraft in the cruising mode. This takes advantage of the span-wise symmetry mentioned earlier to ensure that the inertia tensor is as close to diagonal as possible. The rotor-wing aerodynamic forces may require the implementation of additional tools, such as the Blade Element Momentum Theory, to determine the subsequent aerodynamic torques. Analysis of the rotor-wing aerodynamic forces may be simplified by taking advantage of wing symmetry. By placing identical wings 104 at a 180° offset to one another, the aerodynamic torques experienced in the monocopter mode may be canceled out. Hence, with a specific wing design and orthogonally arranged flight modes, the transition mechanism may only need to rotate the wings 104 to be 180° relative to each other. Consequently, the aircraft 100 may adopt a structurally efficient transition mechanism where flap control rotates the entire wing 104. To effect a transition, the aircraft 100 may rotate each wing by 90° in opposite directions. This is illustrated in FIG. 5.

Figure 5:
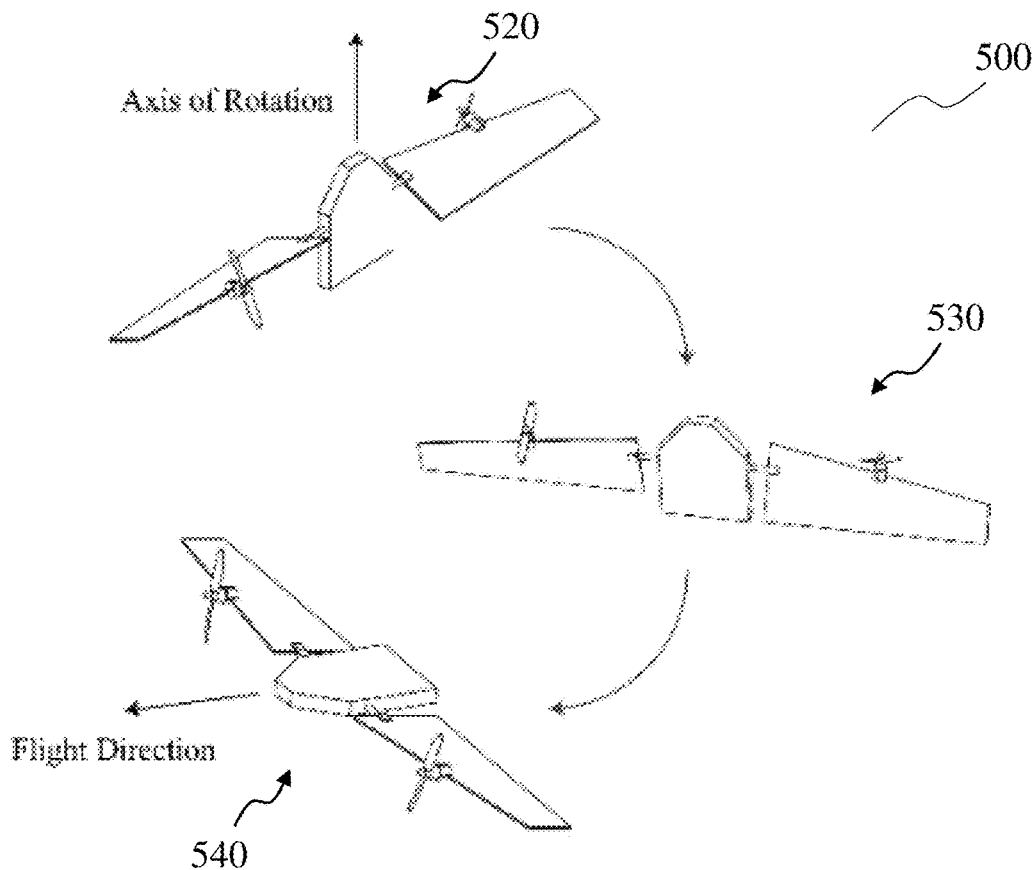
FIG. 5 shows a diagram illustrating the flight mode orientations and transitions of the aircraft according to various embodiments.

FIG. 5 shows a diagram 500 illustrating the flight mode orientations and transitions of the aircraft 100 according to various embodiments. The diagram 500 shows the aircraft 100 in the monocopter mode 520, in transition 530 and in the cruising mode 540. To transit between the cruising mode 540 and the monocopter mode 520, the servo motors 106 would need to rotate the wings 104 such that the first wing 104A rotates at least substantially 180° relative to the second wing 104B. To achieve the relative angle of 180°, the servo motor 106 controlling the first wing 104A and the servo motor 106 controlling the second wing 104B may rotate in opposite directions. For example, the servo motor 106 controlling the first wing 104A may rotate by $\alpha_1$ in a first direction and the servo motor 106 controlling the second wing 104B may rotate by $\alpha_2$ in a second direction opposing the first direction, wherein $\alpha_1 + \alpha_2 = 180°$. It may be preferable for each servo motor 106 to rotate by a relatively small angle, for a smooth transition between the flight modes. Thus, it may be preferred for each servo motor 106 to rotate by approximately 90° in opposite directions, to change the flight mode of the aircraft 100.

With the two flight modes operating orthogonal to one another, it becomes desirable to use a tailless wing configuration for the cruising mode 540 for several reasons. First, the tailless wing configuration may be capable of greater aerodynamic efficiency provided an active control system is implemented to maintain an efficient $C_L/C_D$ angle which is useful for cruising. Second, the tailless wing configuration may reduce the number of aerodynamically inefficient surfaces when the aircraft 100 is operating in the monocopter mode 520. In the absence of any retracting or extending mechanism, the aircraft tail would generate only drag when the aircraft 100 spins about the yawing axis, as the surfaces of the tail would be at least substantially perpendicular to the freestream velocity of the aircraft 100. The lack of tail control surfaces may however, cause increased pitch and yaw instability. The aircraft 100 may overcome the increased pitch and yaw instability using an active control system. The active control system may include a feedback controller with an IMU.

However, the tailless configuration of the aircraft 100 may be different from conventional flying wings in that flap control by the servo motors 106 may rotate entire wings 104, including the thrust motors 104 on the wings 104. This is akin to giving each wing 104 thrust vectoring capabilities along one axis of rotation. Hence the aircraft 100 may use the servo motors 106 to change the direction of the thrust from each thrust motor 108 to control the pitch of the aircraft 100, as well as to change the angle of attack of each wing 104 to control the roll of the aircraft 100. The aircraft 100 may include a flight controller 110 to compute the necessary rotation angles of each servo motor 106 based on a desired flight route or flight parameter. The flight controller 110 may control the servo motors 106 based on the computed rotation angles. The flight controller 110 may also alter the force generated by each thrust motor 108, so as to control the yaw of the aircraft 100. It should be noted that at small changes to the angle of attack, the change in direction of motor thrust may be complementary towards the intended effects on the respective wing 104. For example, to pitch the aircraft 100 upwards, the wing 104 may be commanded to increase its angle of attack. This may divert a component of motor thrust in the upwards direction, resulting in an upwards torque. The transition mechanism of the aircraft 100 uses only the aerodynamic surfaces, thrust motors 108 and the servo motors 106 already implemented for the two flight modes to execute a transition. The transition mechanism may execute a transition by rotating the wings 104 into the direction of the flight mode of choice. Motor thrust may be controlled during these stages to ensure that the aircraft 100 is oriented properly. When transitioning from the monocopter mode to the cruising mode, the aircraft 100 may take advantage of the positive angle of attack necessary in either mode to execute a clean transition that consistently leaves the aircraft 100 the right side up during the cruising mode.

Using the large wing areas associated with fixed-wing flight for rotor-wing maneuvers produces a pair of unusual design problems. Firstly, gyroscopic precession while in the monocopter mode may produce a significant wing twist during flight. Secondly, the aircraft 100 may also be subject to pronounced cases of asymmetric blade loading. Gyroscopic precession manifests itself in the form of a torque about each of the thrust motors 108 that affects the wing pitch during the monocopter mode through the flexing of the wing arm. While it does not directly count as a component in the equations of motion, the high rotation speeds of both the thrust motors 108 and the aircraft 100 will cause the wings 104 to flex, thereby influencing their angles of attack and consequently the lift generated by each wing 104. The rotating mass of the thrust motor system may produce a torque on the rotating body frame as described by Equation (9):

$$\tau_{gyro} = I_{motor} \omega_{motor} \dot{\theta} \qquad (9)$$

where $\tau_{gyro}$ is the torque, $I_{motor}$ is the inertia tensor of the thrust motor 108, $\omega_{motor}$ is the angular velocity of the thrust motor 108 and $\dot{\theta}$ is the angular velocity of the aircraft 100. Given the large wing area on the aircraft 100, this may produce a pronounced twist along the wing 104 while the aircraft 100 operates in the monocopter mode, thus changing the effective α across the wing 104. This in turn, may affect the lift and drag forces experienced along each wing 104. The change in α may be approximated to be:

$$\alpha = k_{twist} \tau_{gyro} y \qquad (10)$$

where $k_{twist}$ is the twist coefficient and y is the span-wise distance from the body frame origin. Based on Equations (9) and (10), it can be seen that to reduce changes in α, it would be useful to keep $\dot{\theta}$ constant during the monocopter mode. It can also be seen that, depending on the directions of rotation of $\omega_{motor}$ and $\dot{\theta}$, the effects on α may be exacerbated or reduced, as illustrated in the table 600.

Figure 6:
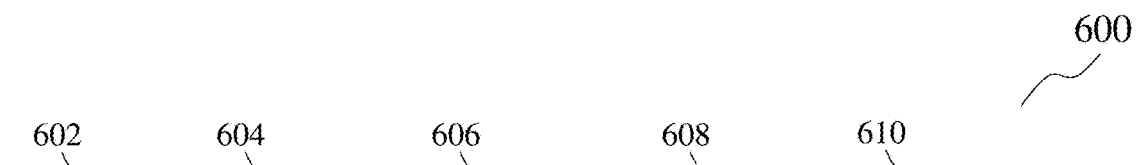
FIG. 6 shows a table listing the rotation configurations of the aircraft.

FIG. 6 shows a table 600 listing the rotation configurations of the aircraft 100. The table 600 includes a configuration column 602, a hover rotation column 604, a port motor rotation 606, a starboard motor rotation column 608 and a precession support column 610. For each configuration labeled in the configuration column 602—the hover rotation column 604 lists the rotation direction of the wings 104 when the aircraft 100 is in the monocopter mode, the port motor rotation column 606 lists the rotation direction of the propellers of the thrust motor 108 on the port wing 104a, and the starboard motor rotation column 608 lists the rotation direction of the propellers of the thrust motor 108 on the starboard wing 104b. The precession support column 610 lists the resulting gyroscopic precession of each configuration. If the positive direction of both the thrust motor 108 and the aircraft rotation is set to be collinear to the direction of thrust, positive τ will be equivalent to a positive pitch upwards with respect to the wing 104. The table 600 shows that it is preferable that the aircraft design adheres to either configurations A, D, E or H whereby the torque effects are in the same direction for both wings 104. The aircraft 100 may take advantage of and accommodate for two phenomena unique to its structure, the phenomena being gyroscopic precession and asymmetrical blade loading. The gyroscopic precession produces a torque along each wing while in the monocopter mode due to the simultaneous rotation of the aircraft 100 and each individual thrust motor 108. The effect may increase each wing's angle of attack, thereby controlling the monocopter mode's altitude and attitude.

The direction of rotation is taken relative to their respective directions of thrust. Rotational configurations that are "unbalanced" may be undesirable as one wing will have a positive twist while the other will have a negative twist, thus requiring the flight controller to perform additional compensations during the monocopter mode. For the remaining configurations (A, D, E and H), while the magnitudes of $\omega_{motor}$ might defer between the motors, the twist effect is still in the same direction for both wings, thereby reducing the relative differences in blade twist. Within these, configurations A and H are the most optimal as a positive increase in the angle of attack on both wings will give greater lift. However, configurations A and H may have an undesirable impact on the cruising mode. The relationship between $\omega_{motor}$ and motor forces and torques may be approximated as follows:

$$F = k_F \omega_{motor}^2 \qquad (11)$$

$$M = k_M \omega_{motor}^2 + I_{motor} \dot{\omega}_{motor} \qquad (12)$$

where $k_F$ is the motor lift constant and $k_M$ is the motor drag constant. With both motors rotating in the same direction, the torque term, M, would cause the aircraft in the cruising mode to roll. However, this consequence may be preferable over an unbalanced wing twist in the monocopter mode as the rolling of the aircraft in the cruising mode may be resolved using a simple flap correction.

The asymmetrical blade loading effect may improve or impair the torque effects while in the monocopter mode, as the rotation of the aircraft may produce a non-uniform inflow at each thrust motor 108. By arranging the aircraft 100 and the thrust motor rotation in the same direction, the torque may be increased thereby improving the power efficiency of the monocopter mode. Asymmetrical blade loading is a manifestation of non-uniform freestream velocities relative to the thrust motor 108's rotating propeller. The result is a shift in the P.C. of each thrust motor 108 depending on the inflow distribution. The aircraft 100 in both flight modes may experience some form of asymmetrical blade loading. In the monocopter mode, the $\dot{\theta}$ term may cause the inflow distribution to be biased towards the outer side of the thrust motor 108. In the cruising mode, the phenomena may manifest itself when the thrust motors 108 are operated at a high angle of attack, a common situation given that flap control rotates the entire wing 104 along with the thrust motor 108. Depending on the thrust motor rotation, this will either shift the distribution away from or towards the body origin. With configuration A, the following equation may be used to approximate the shift in the body frame:

$$\delta_{PABL} = -\delta_{SBL} = \begin{bmatrix} 0 \\ k_{flap}\alpha + k_{rot}\theta \\ 0 \end{bmatrix} \quad (13)$$

where $\delta_{PABL}$ is for the port and $\delta_{SABL}$ is for the starboard motor. $k_{flap}$ and $k_{rot}$ are defined to be the loading coefficients. Similar to the motor torque term, the flight controller will also need to correct for this phenomenon, this time via a motor thrust correction.

Figure 7A:
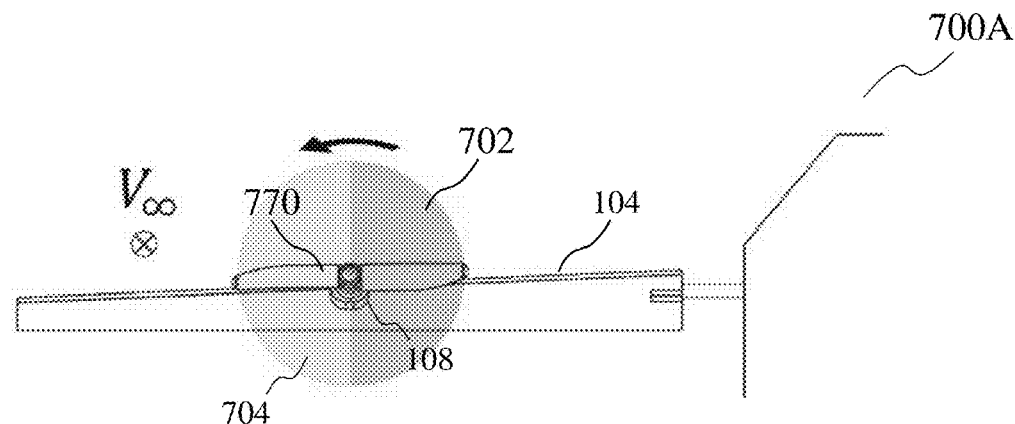
FIG. 7A shows a diagram showing the leading edge of a wing according to various embodiments.

FIG. 7A shows a diagram 700A showing the leading edge of a wing 104 according to various embodiments. The thrust motor 108 mounted on the leading edge of the wing 104 may include a propeller 770 rotatable about a central propeller axis. The central propeller axis may be at least substantially parallel to the chord of the wing 104, or may be slightly off parallel to the chord of the wing 104. From the perspective of the freestream velocity $V_\infty$ the tilt of the thrust motor 108 may produce different velocities at the inner region 702 of the propeller 770 as compared to at the outer region 704 of the propeller 770. The difference in the velocities the inner and outer regions may result in a torque on the thrust motor 108 as the force distribution across the propeller 770 may not be uniform.

Figure 7B:
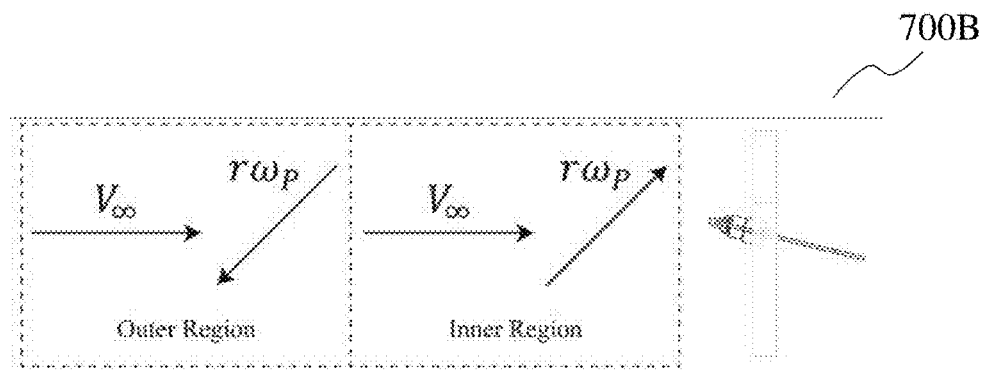
FIG. 7B shows a diagram showing the directions of the inflow velocities at the inner region and the outer region of the propeller.

FIG. 7B shows a diagram 700B showing the directions of the inflow velocities at the inner region 702 and the outer region 704 of the propeller 770. The diagram 700B illustrates the asymmetrical blade effects or P-factor, of the thrust motor direction with respect to the aircraft direction. Depending on the rotation direction of the propeller 770, the inner and outer regions of the propeller 770 will experience either an increase or a decrease in the inflow velocity. Observing the thrust motor 108 from the lateral perspective, it can be seen that in the outer region 704, the propeller blade may move toward the freestream thereby increasing the inflow velocity, whereas in the inner region 702, the propeller blade may move away from the freestream thereby decreasing the inflow velocity. Considering that servo motor rotation for control will create instances where the thrust motor is subject to high angles of attack, the velocity inflow relative across the propeller 770 cannot be assumed to be uniform. In the monocopter mode, this may be compounded by the fact that the entire aircraft 100 is also rotating during flight. If both the aircraft 100 and the propellers 770 of both thrust motors 108 rotated in the counter-clockwise direction (i.e. configuration A), the velocities experienced by the propellers 770 would be biased towards the outer region of the propeller 770. Assuming the propellers 770 were originally designed for uniform inflow, this would push the origin of the thrust a distance outward. This would cause a slight increase in the torque experienced by the aircraft 100, thereby requiring less power for takeoff. This effect is also observed in configuration H where the outer regions experience the higher velocities. The rest of the configurations experience the higher velocities on the inner region of the propeller 770, making such configurations less efficient in terms of generating lift in the monocopter mode.

In the following paragraphs, the dynamic model of the setup and its transitionary states and control strategy are explained in relation to FIGS. 8-10.

Figure 8:
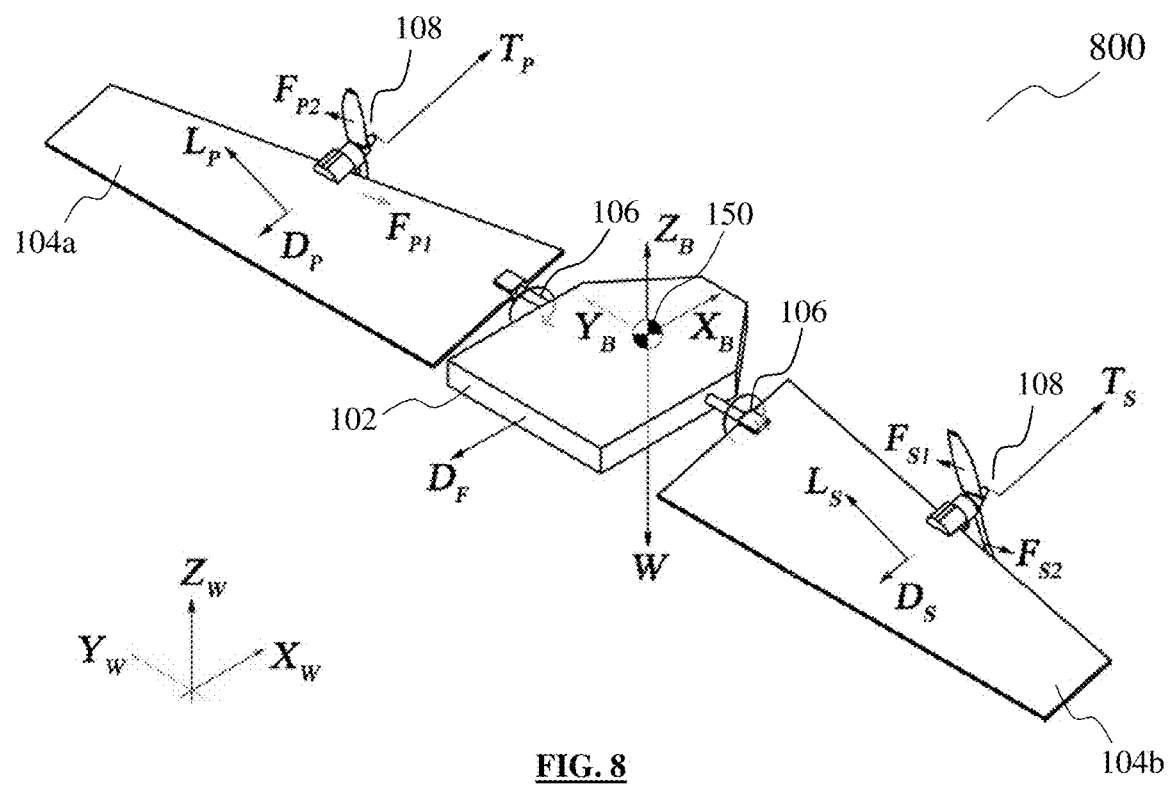
FIG. 8 shows a free-body diagram of the aircraft in the cruising mode.

FIG. 8 shows a free-body diagram 800 of the aircraft 100 in the cruising mode. The global reference frame, denoted by $X_W$-$Y_W$-$Z_W$, is attached to Earth such that gravity (g) is defined to be g=[0 0 −1] ||g|| where ||g|| is the acceleration due to the Earth, which has an approximate value of 9.81 ms$^{-1}$. Time in this reference frame is defined to be $t_W$. The body frame, denoted by $X_B$-$Y_B$-$Z_B$ with time t, is attached to the center of gravity 150 of the craft. The body frame is used as the primary workspace as the majority of forces experienced by the aircraft 100 are dependent on velocities relative to its aerodynamic surfaces (with the only exception being gravity). The corresponding rotations about each axis are defined as θ (roll), ϕ (pitch), and Ψ (yaw) with the subscript W used should they be in reference to the global frame. To link the two frame together, the global frame is co-located with the body frame at time t=0. In reference to the body frame, the left side (also referred to as the port side) of the aircraft 100 is defined to be the direction that always corresponds to the positive y-axis. Consequently, the right side (also referred to as the starboard side) is defined to always correspond to the negative y-axis.

In its cruising mode, the forces and torques experienced by the aircraft 100 may be broken down into three sources; gravitational, aerodynamic and motor. Since the distribution of mass is centered and symmetrical along the spine of the aircraft 100, i.e. the $X_B$ axis and since the body frame origin is pinned to the center of gravity 150, gravitational forces and torques may be reduced to a single force, W, broken down into the three components of the body frame and no torques. Therefore, W may be defined as:

$$W = mR_{xyz}g \quad (14)$$

where m is the mass of the aircraft 100 and $R_{xyz}$ is the rotation matrix.

Aerodynamic forces may be broken down into two components: lift (L), which is perpendicular to the direction of the local inflow; and drag (D) which is parallel and equal to the direction of the local inflow. In the cruising mode, the aircraft 100 may experience lift and drag forces on its port and starboard wings ($L_P$, $D_P$ and $L_S$, $D_S$ respectively) along with a parasitic drag $D_F$ due to the form of the fuselage. The wing lift and drag forces can be derived using the equations (15) and (16):

$$dL(r) = \tfrac{1}{2}\rho c C_L U^2 dy \quad (15)$$

$$dD(r) = \tfrac{1}{2}\rho c C_D U^2 dy \quad (16)$$

where dL is the lift component and dD is the drag component, of a blade element at perpendicular distance r from the $X_B$ axis. ρ is the density of air in kg·m$^{-3}$. According to the International Standard Atmosphere (ISA), at sea level and at 15° C., air has a density of approximately 1.225 kg·m$^{-3}$. The remaining four variables are properties of the blade element and can be defined as functions of r based on the design of the aircraft 100. c represents the chord length, $C_L$ and $C_D$ represent the lift and drag coefficients and U represents the inflow velocity of the blade element. Strictly speaking, dL is defined to be perpendicular to the inflow velocity of the air at the specific blade element while dD is in the direction parallel to it. Considering that the fixed wing mode is intended to be used primarily for forward flying cruising and assuming a wind speed of zero, the inflow velocity can be approximated to be parallel to the $X_B$ axis. Consequently, the torque contribution about the $X_B$ axis are simply the lift and drag components multiplied by r. The torque contribution about the $Y_B$ axis is assumed to be negligible as mentioned earlier by placing the centre of gravity 150 to be near the quarter chord.

Figure 9:
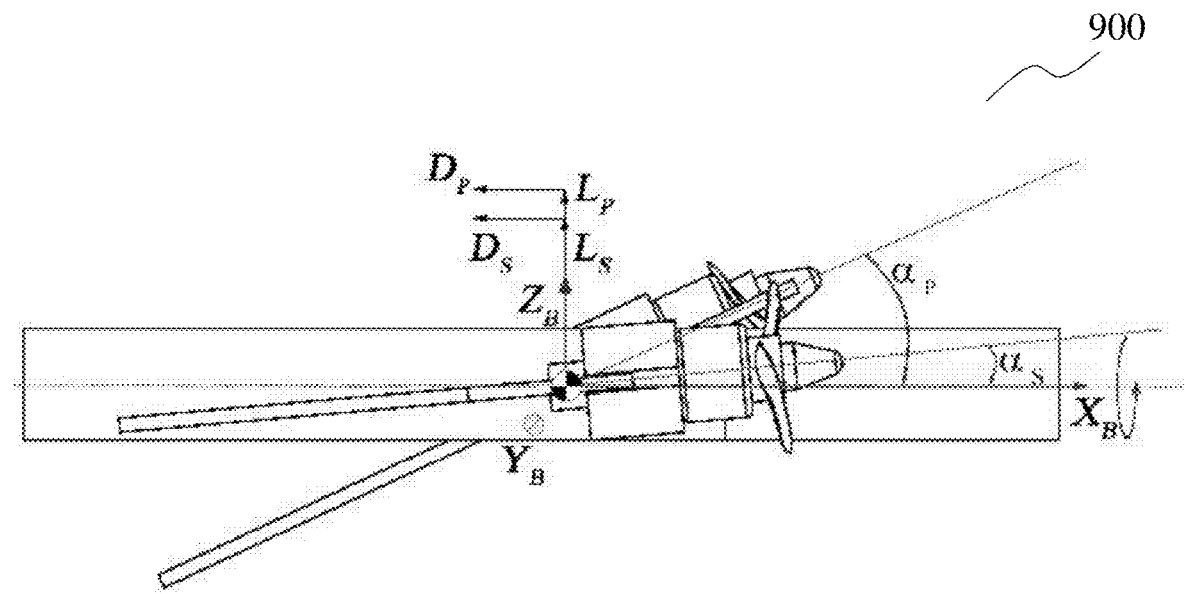
FIG. 9 shows a lateral view of the aircraft, illustrating forces influenced by the angle of attack of the wings.

FIG. 9 shows a lateral view 900 of the aircraft 100, illustrating forces influenced by the angle of attack of the wings 104. The effective torques generated by the lift and drag forces can be calculated simply by multiplying components (2) and (3) by their respective distances r. These can be simplified into the terms $R_S L_S$, $R_S D_S$, $R_P L_P$ and $R_P D_P$ where $R_S$ and $R_P$ are the origin points of the net aerodynamic force on each wing 104. Lastly, there are the motor forces which can be broken down into a thrust force (T) and a pair of reactionary forces (one per propeller blade) that are a result of the fluid it is pushing against. The thrust force due to the thrust motor 108 can be defined as:

$$T = \begin{bmatrix} C_t(J)\rho n^2 D^4 \cos(\alpha) \\ 0 \\ C_t(J)\rho n^2 D^4 \sin(\alpha) \end{bmatrix} \quad (17)$$

where $C_t$ is the motor thrust coefficient, n is the propeller revolution rate in revolutions per second, D is the propeller diameter in meters, α is the angle of attack of the wing 104 and J is defined to be:

$$J = \frac{V}{nD} \quad (18)$$

where V is the propeller freestream velocity. The propeller revolution rate can then be linked to pilot input depending on the way the electronic speed controller (ESC) translates the radio controller input. Their torque effect of each thrust can be assumed to act at the center of rotation of each rotor (defined as $R_{motor}$). Though it can be argued that the aircraft 100 will experience asymmetrical blade effects while also in cruising mode (in the directions suggested in FIG. 8), it can be assumed that the asymmetrical blade effects have negligible effect as the primary state of the aircraft 100 in this flight will be forward flight (with minimal rotations about the three axes). The pair of reactionary forces will always cancel each other out due to the symmetry of a two blade propeller. However, their net torque is non-zero as the position of the force relative to the center of gravity is not equal. These forces are hard to model given the diverse velocity conditions experienced by each individual propeller. Likewise, the parasitic drag due to the fuselage is hard to calculate given that it lacks an airfoil. These effects can be simplified using the drag model:

$$F = -k_{quad}\|v^b\|v^b - k_{lin}v^b \quad (19)$$

where $k_{quad}$ and $k_{lin}$ are experimentally derived free coefficients and $v^b$ is the relative inflow velocity of the component. Using this, the effects of propeller reaction force can be estimated and defined as $\delta_{prop}F_S$ and $\delta_{prop}F_P$ where $\delta_{prop}$ is the distance between the midpoint of the two blades on a propeller. Hence the equations of motion are:

$$\begin{bmatrix} F_x \\ F_y \\ F_z \\ M_x \\ M_y \\ M_z \end{bmatrix} = \begin{bmatrix} mR_{xyz}g + \begin{bmatrix} (-D_P - D_S - D_F) + (T_P\cos(\alpha_P) + T_S\cos(\alpha_S)) \\ 0 \\ (L_P + L_S) + (T_P\sin(\alpha_P) + T_S\sin(\alpha_S)) \end{bmatrix} \\ \delta_{prop}F_P + \delta_{prop}F_S + R_P L_P - R_S L_S + \\ R_{motor}T_P\sin(\alpha_P) - R_{motor}T_S(\alpha_S)) \\ 0 \\ R_S D_S - R_P D_P + R_{motor}T_S\cos(\alpha_S) - R_{motor}T_P\cos(\alpha_P) \end{bmatrix} \quad (20)$$

Figure 10:
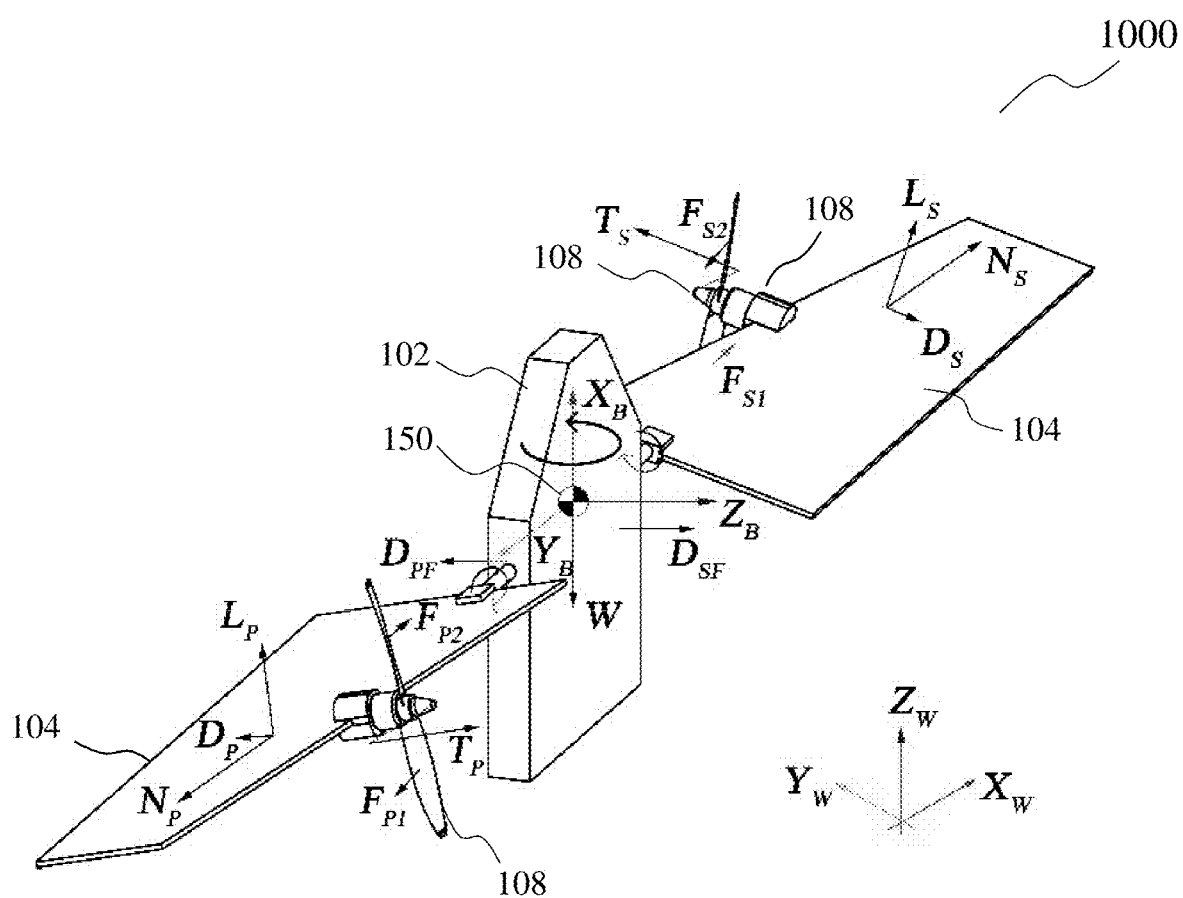
FIG. 10 shows a free body diagram of the aircraft in the monocopter mode.

FIG. 10 shows a free body diagram 1000 of the aircraft 100 in the monocopter mode. Building from the equations of motion of the cruising mode, the motor and aerodynamic forces need to be rotated. Fuselage drag now occurs due to the rotational motion of the craft ($D_{SF}$, $D_{PF}$). However, the fuselage drag may be assumed to be negligible as the surface area of the fuselage may be minimal and may be close to the axis of rotation (yawing axis). The centrifugal force on each wing, $C_P$ and $C_S$, needs to be accounted for. These centrifugal forces can be assumed to cancel each other out as the aircraft 100 is balanced along the axis of rotation (yawing axis). Lastly, the effects of asymmetric blade loading due to the constant rotation of the craft need to be included as the motors are now rotating a significant distance away and at high speed. The shift in thrust origin is denoted by the value $\delta_{motor}$.

$$\begin{bmatrix} F_x \\ F_y \\ F_z \\ M_x \\ M_y \\ M_z \end{bmatrix} = \begin{bmatrix} mR_{xyz}g + \begin{bmatrix} (L_P + L_S) + (T_P\sin(\alpha_P) + T_S\sin(\alpha_S)) \\ 0 \\ (D_S - D_P) + (T_P\cos(\alpha_P) - T_S\cos(\alpha_S)) \end{bmatrix} \\ \delta_{prop}F_P + \delta_{prop}F_S + R_P L_P - R_S L_S + \ldots \\ (R_{motor} + \delta_{motor})T_P\cos(\alpha_P) + (R_{motor} + \delta_{motor})T_S\cos(\alpha_S) \\ 0 \\ R_S D_S - R_P D_P + \ldots \\ (R_{motor} + \delta_{motor})T_S\sin(\alpha_S) - (R_{motor} + \delta_{motor})T_P\sin(\alpha_P) \end{bmatrix} \quad (21)$$

Figure 11:
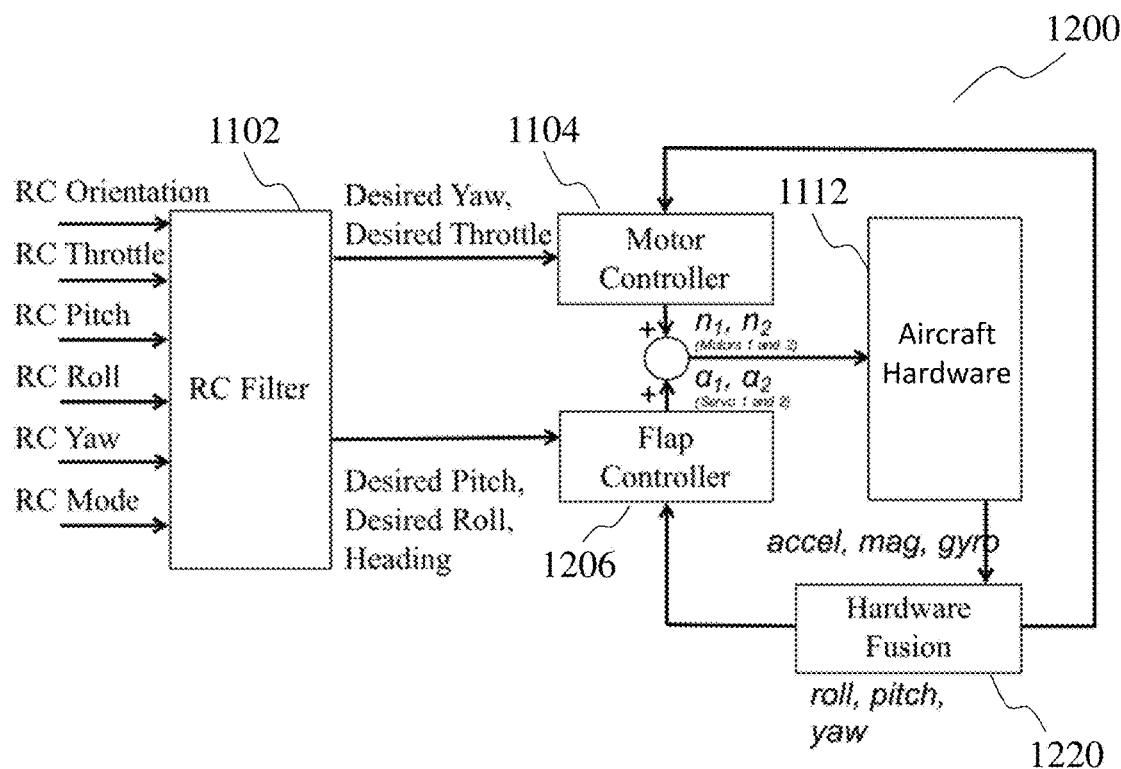
FIG. 11 shows a control system block diagram of the aircraft when it is operating in the monocopter mode and in the cruising mode, according to various embodiments

FIG. 11 shows a control system block diagram 1100 of the aircraft 100 when it is operating in the cruising mode or in the monocopter mode, according to various embodiments. The control system may include a filter 1102. The filter 1102 may receive a radio control (RC) signal that includes flight commands. The flight commands may include the commanded throttle, pitch, roll and yaw. The flight commands may also include orientation data, i.e. magnetometer data from an IMU. The IMU may be placed on a radio controller used for sending the RC signal to the datalink system of the aircraft 100. The RC signal may also include RC mode, in other words, a command from the pilot or user for selecting the flight mode of the aircraft 100. The RC Mode may indicate whether the aircraft 100 should operate in the cruising mode or in the monocopter mode. The filter 1102 may transmit the desired altitude to a motor controller 1104. The filter 1102 may transmit the desired pitch/roll to a flap controller 1206. The filter 1102 may receive the RC signal from the datalink system of the aircraft 100. The filter 1102 may clean up the RC signal, in other words, remove noise from the flight commands and the magnetometer readings to generate the desired altitude, desired pitch/roll and transmitter orientation data. The filter 1102 may format the flight commands into data that is readable by the motor controller 1104 and the flap controller 1206. The filter 1102 may transmit the desired yaw and desired throttle to a motor controller 1104. The filter 1102 may transmit the desired pitch and the desired roll to a flap controller 1206. In the cruising mode, the motor controller 1104 may compute the thrust force required from each of the thrust motors 108 based on the desired yaw and desired throttle. The motor controller 1104 may be configured to either maintain or vary the speed of the aircraft 100. The motor controller 1104 may increase the speed of the aircraft 100 by increasing the thrust of the thrust motors 104, and may decrease the speed of the aircraft 100 by decreasing the thrust of the thrust motors 104. The flap controller 1206 may compute the rotation angles of each of the servo motors 106 required, based on the desired pitch and the desired roll. The outputs from the motor controller 1104 and the flap controller 1206 may be combined and provided as inputs to a central processor of the aircraft hardware 1112 to control the thrust motors 108 and the servo motors 106 accordingly.

In the monocopter mode, the motor controller 1104 may compute the thrust force required from each of the thrust motors 108 based on the desired altitude. The motor controller 1104 may be configured to either maintain or vary the rotation rate, also referred herein as revolutions per minute (RPM), of the aircraft 100. The motor controller 1104 may increase the RPM of the aircraft 100 by increasing the collective thrust of the thrust motors 104, and may decrease the RPM of the aircraft 100 by decreasing the collective thrust of the thrust motors 104. The flap controller 1206 may compute the rotation angles of each of the servo motors 106 required, based on the desired pitch/roll and the transmitter orientation. The flap controller 1206 may be configured to provide control parameters to the wings 104, for controlling altitude and attitude. The outputs from the motor controller 1104 and the flap controller 1206 may be provided as inputs to the central processor of the aircraft hardware 1112 to control the thrust motors 108 and the servo motors 106 accordingly. The aircraft hardware 1112 may provide the orientation measurements of the aircraft 100 to the flap controller 1206 as negative feedback to adjust the outputs of the flap controller 1206, via a hardware fusion module 1220. The hardware fusion module 1220 may perform discrete sensor fusion of IMU data to produce accurate 6 degrees of freedom data. The motor controller 1104, the flap controller 1206, and the central processor may be part of the flight controller 110.

Stabilizing control may be built into the motor controller 1104 and the flap controller 1206. In short, in the cruising mode, the motor controller 1104 may control the forward speed of the aircraft 100 while the flap controller 1206 may control pitch and roll of the aircraft 100. In the monocopter mode, the motor controller 1104 may control the RPM and thus altitude, of the aircraft 100. The flap controller 1206 may also influence the altitude of the aircraft 100 but it may be primarily used to control the pitch and roll of the aircraft 100.

Experiments were conducted to verify the effects of gyroscopic precession and the stability of the aircraft 100 in the monocopter mode. In the following, the experiments and the results of the experiments will be described. The prototype aircraft is shown in FIG. 1. The prototype aircraft is a 500 g, carbon fiber and wood model with a 105 cm wingspan in both modes, a 15 cm to 7.5 cm linear tapered chord and an operating rotation speed of 240 revolutions per minute (RPM). The airfoils of the prototype aircraft wings are flat plate airfoils due to the ease of production, maintenance and repairability of flat plate airfoils. The symmetry of the flat plate airfoil also has the added benefit of producing identical aerodynamic effects on each wing at any given angle of attack, regardless of its upwards direction. Due to the high functionality demanded of the servo (namely high torque and speed), a helicopter tail servo (MKS DS95i) combined with a collinear mounted rotary bearing (to reduce the bending load) is used for wing control. This servo however is limited in its range of rotation. With a maximum range of 120°, the prototype aircraft is forced to operate the two flight modes near each end of its rotation range. The gyroscopic precession effect was used to alleviate this (by purposely flexing the wing on top of the servo rotation to increase angle of attack). Specifically, configuration A was chosen for its consequent precession support. This also had the added benefit of guaranteeing propeller clearance during monocopter mode takeoff.

Figure 12:
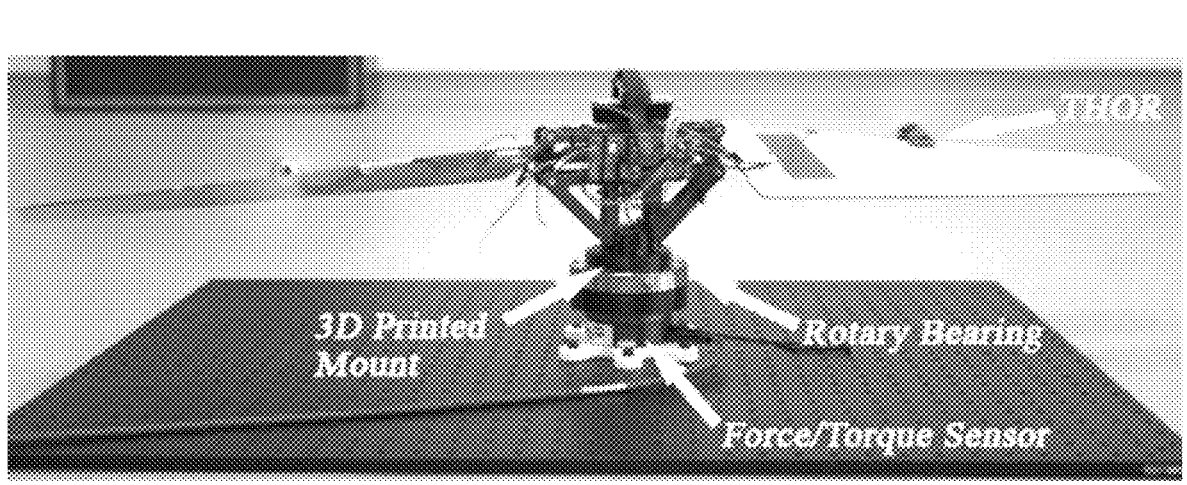
FIG. 12 shows the test setup used in the experiments.

FIG. 12 shows the test setup 1300 used in the experiments. Several tests were also conducted to verify the transitional ability of the prototype aircraft. In the force/torque sensor experiment, the prototype aircraft is mounted onto a ATI 6-axis Capacitive Force/Torque Sensor. An MTO-050 rotary bearing is used to link the prototype aircraft to the sensor such that the former is free to rotate around its axis of rotation (yawing axis) in the monocopter mode. The angle of attack and throttle input to the prototype aircraft was set to constants within the effective range of the flat plate airfoil. Configurations A to H in Table 600 were then tested.

Figure 13:
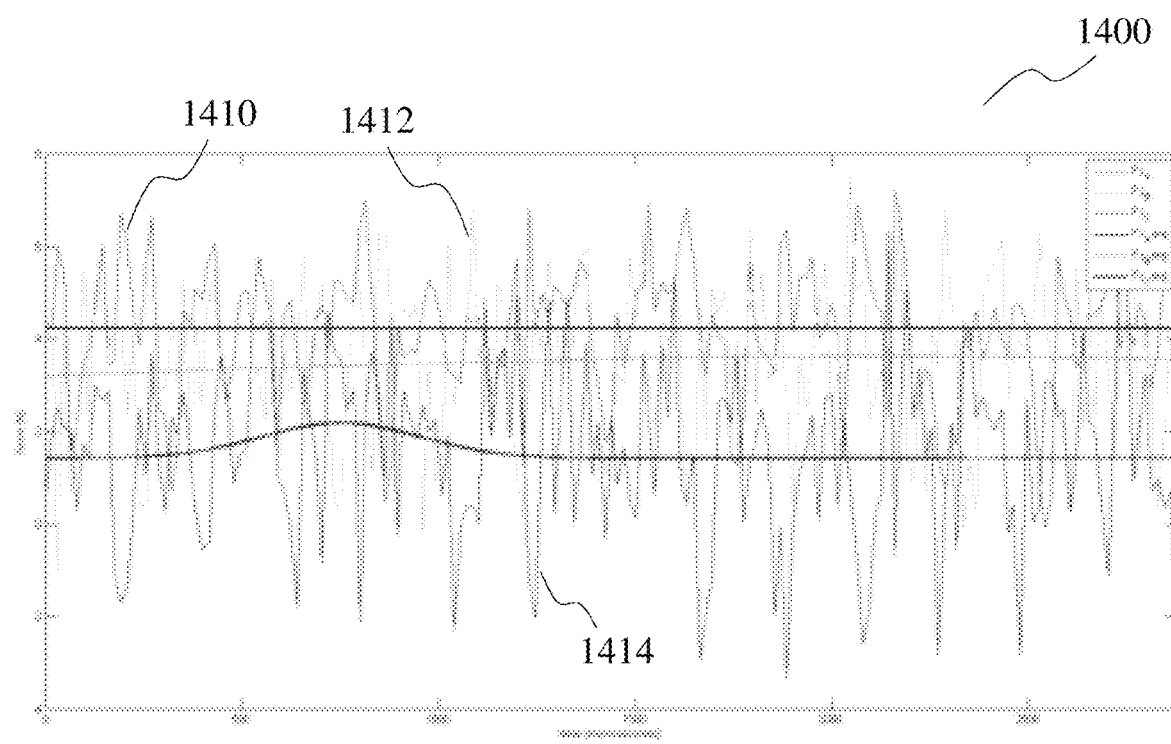
FIG. 13 shows a graph showing the force effects of various rotor and motor configurations.

FIG. 13 shows a graph 1400 showing the force effects of various rotor and motor configurations. The graph 1400 includes a horizontal axis indicating time in units of microseconds, and a vertical axis indicating force in units of Newton. The thicker lines denote the average. To reduce clutter, only configurations A, B and D are plotted in the graph 1400. The graph 1400 includes a first plot 1410 representing configuration H; a second plot 1412 representing configurations C, F and G; and a third plot 1414 representing configuration E. These results correspond to the effects predicted with regards to gyroscopic precession. In configurations D and E, the wing is twisted downward, resulting in the lowest average lift generated at a given angle of attack and throttle. Configuration A and H generate the most lift due to the raised angle of attack and Configuration B, C, F and G generate a net lift that is less than configuration A and H but more than configuration D and E. This is due to one wing experiencing improved lift while the other experiencing impaired lift due to an increase and decrease in angle of attack respectively. The frequency of oscillation due to the unequal force between the two wings could not be observed due to high amounts of noise in the sensor data. This data was corroborated by takeoff tests using the various configurations. Only configurations A and H were able to takeoff successfully (at approximately 25% throttle). All other configurations failed at the same starting angle of attack although there were some instances where the craft momentarily lifted off the ground after an abrupt cut in throttle. This would correspond to the wing returning to the original angle of attack, due to the disappearance of the torque, while still spinning at a sufficient angular velocity for takeoff.

Figure 14:
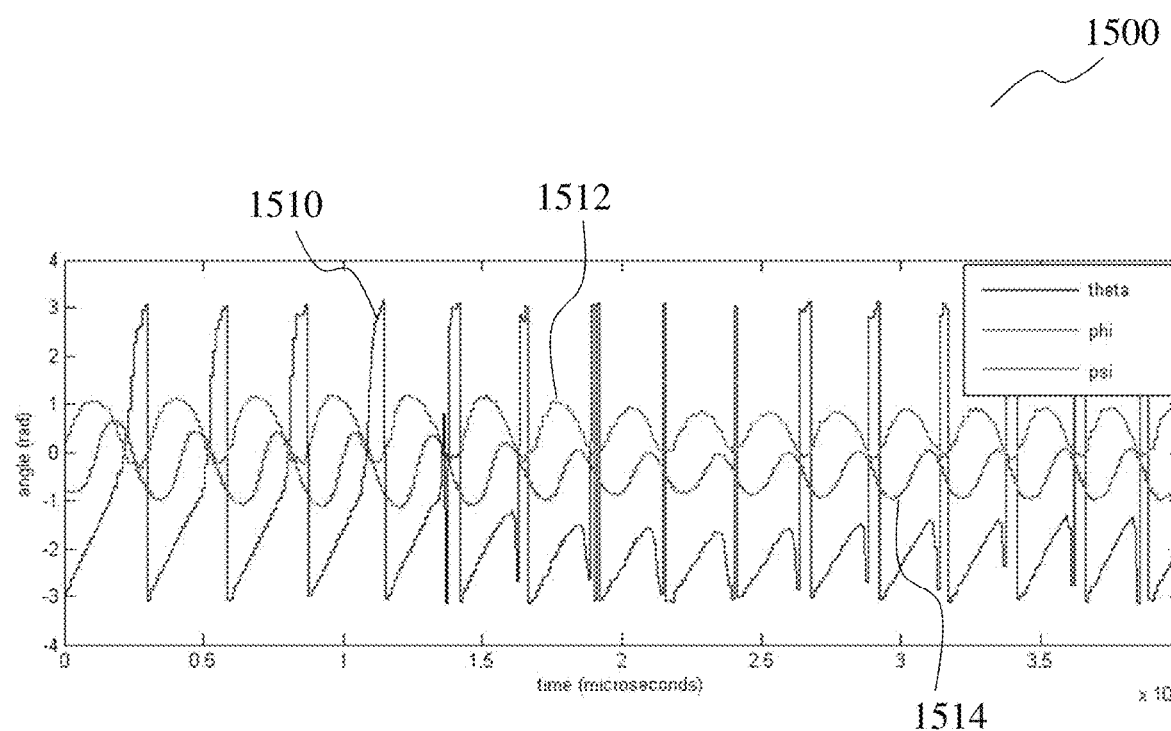
FIG. 14 shows a graph showing the attitude data of the prototype aircraft in the monocopter mode, at a constant throttle and zero pitch/roll input.

FIG. 14 shows a graph 1500 showing the attitude data of the prototype aircraft in the monocopter mode, at a constant throttle and zero pitch/roll input. The attitude data of the graph 1500 were obtained from flight tests conducted to verify the stability of the dual wing configuration of the aircraft. The graph 1500 includes a horizontal axis 1502 indicating time in units of microseconds, and a vertical axis 1504 indicating angle in units of radians. The graph 1500 includes a first plot 1510 for roll data, a second plot 1512 for pitch data, and a third plot 1514 for yaw data. The data points for the graph 1500 were retrieved from the onboard data logger and were measurements by the IMU. The data shows that the prototype aircraft does indeed possess passive stability. The prototype aircraft is found to oscillate about the Y and Z-axis while hovering. Although there appears to be some lag in the X-axis data, the frequency of the cycles do correspond to the RPM observed by external measuring sources (slow-motion cameras). As in the graph, the prototype aircraft completes a revolution at approximately every $2.5 \times 10^5$ µs, which is equivalent to 240 RPM.

Figure 15:
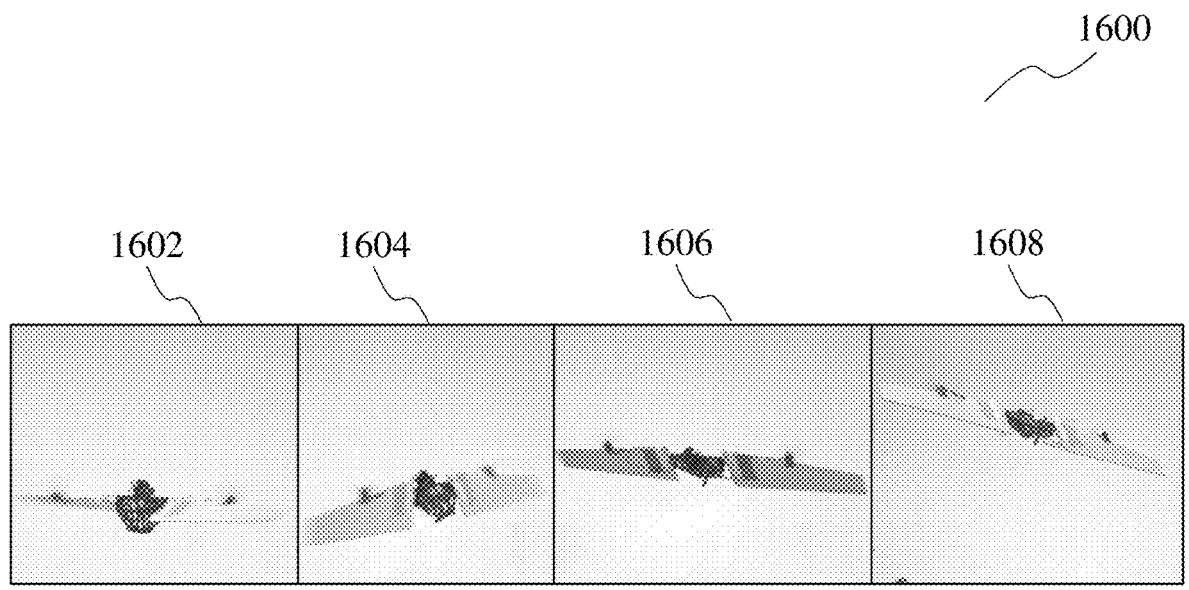
FIG. 15 shows a sequence of photographs of the prototype aircraft during transition flight tests.

FIG. 15 shows a sequence of photographs 1600 of the prototype aircraft during transition flight tests. The transition flight tests validated the transition capability of the aircraft 100 and showed that the design constraints of the two separate flight modes can coexist and at times even complement one another. The first photograph 1602 shows the prototype aircraft flying in the monocopter mode. The second photograph 1604 shows the prototype aircraft when transition of flight mode is activated. When transition of flight mode is activated, the thrust motor 108 on the starboard wing inputs a thrust while the port wing stalls. The third photograph 1606 shows the prototype aircraft at the end of the transition stage. At the end of the transition stage, the port wing is no longer in the stall position. The fourth photograph 1608 shows the prototype aircraft flying in the cruising mode. The results of the transition flight tests were intriguing in that the prototype aircraft always executed the transition with the top side up. This may be due to the direction of rotation of the monocopter mode in combination with the travel angle of each individual servo motor. Due to the requirement of a positive angle of attack for both wings in both modes, one side (being the starboard side with configuration A) would always reach the cruising mode position first while the port side wing stalls, pushing the prototype aircraft into the correct orientation in the process. In other words, due to the positive angle of attack requirement, the starboard wing needs to rotate less to execute the transition. The aircraft may take advantage of this by increasing thrust out of the starboard motor while the port side wing stalls; thereby ensuring the craft orientation is correct while halting the hovering mode's rotation, respectively. To switch back to the monocopter mode from the cruising mode, the aircraft may execute a climb before rotating the servo motors accordingly. Given the monocopter mode's inherent stability, the aircraft may be able to correct perturbations experienced during the transition process.

The results of the conducted experiments have shown that the aircraft 100 which combines a monocopter with a tailless wing structure, may be capable of both cruising and hovering flight modes with unparalleled structural efficiency. The aircraft 100 may be efficient in both long-range, high speed flight (cruising mode) and agile stationary flight (monocopter mode). The aircraft 100 may be adapted to suit various missions, for example, the aircraft 100 may be miniaturized. The aircraft 100 may also include a non-linear feedback controller for both the cruising and the monocopter flight modes. The aircraft 100 may also include the capability to auto-rotate while operating in the monocopter mode. The aircraft 100 may be applied to various fields, including but not limited to: aerial surveillance/reconnaissance, long-range payload delivery, agriculture and visual display entertainment.

Figure 16:
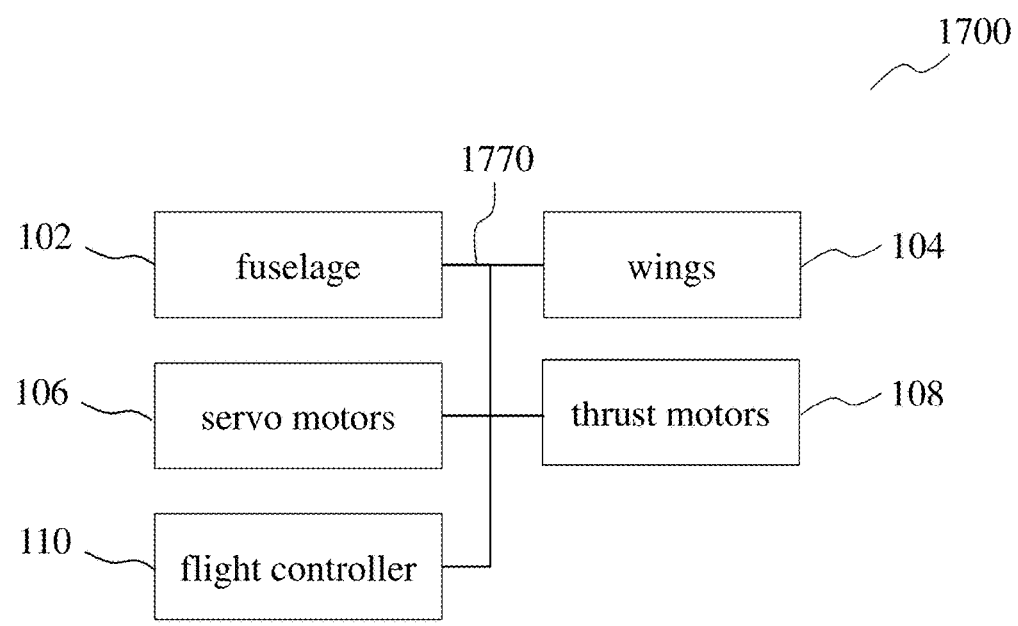
FIG. 16 shows a conceptual diagram of an aircraft according to various embodiments.

FIG. 16 shows a conceptual diagram of an aircraft 1700 according to various embodiments. The aircraft 1700 may include, or may be part of, the aircraft 100. The aircraft 1700 may include a fuselage 102 defining a body frame with longitudinal, lateral and height axes extending perpendicular to each other and intersecting in a center of gravity of the aircraft 1700. The aircraft 1700 may also include a pair of wings 104 which may be rotatably coupled, at wing roots, to opposing lateral sides of the fuselage 102. The pair of wings 104 may be rotatable relative to each other about a rotational axis which is at least substantially parallel to the lateral axis. Each wing 104 may have an airfoil with a leading edge 442 and a chord 440. The aircraft 100 may also include a pair of servo motors 106, each of which may be connected to a corresponding wing 104 and configured to rotate the corresponding wing 104 about its rotational axis in two rotational directions. The aircraft 1700 may also include a pair of thrust motors 108, each of which may be mounted on a corresponding wing 104 and may be configured to provide a thrust in a leading direction of the airfoil of the corresponding wing 104. The aircraft 1700 may also include a flight controller 110 connected to the servo motors 106 and to the thrust motors 108, and configured to control each servo motor 106 and each thrust motor 108, wherein each servo motor 106 is able to rotate the corresponding wing 104 about the rotational axis within such a rotational range that the aircraft 1700 can be selectively operated in a cruising mode, in which the pair of thrust motors 108 provide thrust in a common direction so that the pair of wings 104 are in a non-permanent-rotation-state about a yawing axis which is at least substantially perpendicular to the lateral axis and which at least substantially extends through the center of gravity, and a monocopter mode, in which the pair of thrust motors 108 provide thrust in opposite directions so that the pair of wings 104 are in a permanent-rotation-state about the yawing axis. The fuselage 102, the wings 104, the servo motors 106, the thrust motors 108 and the flight controller 110 may be coupled with each other, like indicated by lines 1770, for example electrically coupled, for example using a line or a cable, and/or mechanically coupled.

In other words, according to various embodiments, an aircraft 1700 may include a fuselage 102, a pair of wings 104, a pair of servo motors 106, a pair of thrust motors 108 and a flight controller 110. The aircraft 1700 may be tailless. The fuselage 102 may define a body frame with a longitudinal axis $X_B$, a lateral axis $Y_B$ and a height axis $Z_B$. Each of the longitudinal axis $X_B$, the lateral axis $Y_B$ and the height axis $Z_B$ may extend perpendicular to each other and may intersect in a centre of gravity 150 of the aircraft 1700. The pair of wings 104 may be rotatably coupled at their wings roots, to opposing lateral sides of the fuselage 102. Each wing 104 may have an airfoil with a leading edge 442 and a chord 440. The airfoil may be symmetrical about the chord 440. The airfoil of each wing 104 may define a corresponding centre of gravity which is located at a distance of a quarter ±5%, or ±1%, of the length of the chord 440 from the leading edge 442 of the airfoil. The airfoil of each wing 104 may be a flat plate airfoil.

The pair of wings 104 may be rotatable relative to each other about a rotational axis. The rotational axis may be at least substantially parallel to the lateral axis $Y_B$, and may be collinear with the lateral axis $Y_B$. Each servo motor 106 may be connected to a respective wing 104, preferably at a position proximal the wing root. The servo motors 106 may be capable of rotating the corresponding wing about its rotational axis in two rotational directions. Each thrust motor 108 may be mounted on a respective wing 104, preferably mounted proximal to the leading edge 442 of the airfoil of the corresponding wing 104. The thrust motors 108 may be configured to provide a thrust in a leading direction of the airfoil of the corresponding wing 104. The leading direction may be at least substantially parallel to the chord 440 of the airfoil of the corresponding wing 104. The flight controller 110 may be connected to the pair of servo motors 106 and may also be connected to the pair of thrust motors 108. The flight controller 110 may be configured to control pitch and roll of the aircraft 1700 by controlling the servo motors 106 to rotate the corresponding wings about the rotational axis. The flight controller 110 may be configured to control yaw of the aircraft 1700 by controlling the thrust motors 108.

The aircraft 1700 may be selectively operable in a cruising mode or a monocopter mode. In the cruising mode, the pair of thrust motors 108 may provide thrust in a common direction so that the pair of wings 104 may be in a non-permanent-rotation-state about a yawing axis. The yawing axis may be at least substantially perpendicular to the lateral axis $Y_B$ and may extend at least substantially through the centre of gravity 150 of the aircraft 1700. The yawing axis may wobble slightly during flight. The yawing axis may extend in a plane defined by the longitudinal axis $X_B$ and the height axis $Z_B$. In the non-permanent-rotation-state, the pair of wings 104 may rotate about the yawing axis, for example to change a yawing direction of the aircraft 1700, but the wings 104 do not continuously rotate about the yawing axis. In the cruising mode, the yawing axis may be at least approximately the height axis $Z_B$.

In the monocopter mode, the pair of thrust motors 108 may provide thrust in opposite directions so that the pair of wings 104 are in a permanent-rotation-state about the yawing axis. In the permanent-rotation-state, the wings 104 may be continuously rotating about the yawing axis. In the monocopter mode, the fuselage 102 may be rotated at least substantially perpendicular relative to the chords 440 of the wings 104 such that the yawing axis is at least substantially the longitudinal axis $X_B$. The flight controller 110 may be configured to control the operation mode of the aircraft 1700, by controlling each servo motor 106 to rotate the corresponding wing 104 about the rotational axis within a rotational range in two directions. The flight controller 110 may be further configured to control each thrust motor 108. The flight controller 110 may individually control each servo motor 106, and may individually control each thrust motor 108. The wings 104 may be rotatable to be at least substantially 180° relative to each other, or each wing 104 may be rotatable by at least substantially 90° in an opposite direction to rotation of the other wing 104, such that the thrust motors 108 provide thrust in opposite directions. The wings 104 may be immovable relative to the fuselage 102 about the longitudinal axis $X_B$ and the height axis $Z_B$.

Each thrust motor 108 may have a propeller that is rotatable about a central propeller axis. Each thrust motor 108 may be configured to rotate its propeller about the central propeller axis in clockwise direction in both the cruising mode and the monocopter mode. When in the monocopter mode, the wings 104 may be configured to rotate in a clockwise direction about the yawing axis. Alternatively, each thrust motor 108 may be configured to rotate its propeller about the central propeller axis in counter-clockwise direction in both the cruising mode and the monocopter mode, and the wings 104, when in the monocopter mode, may be configured to rotate in a counter-clockwise direction about the yawing axis.

According to various embodiments, the aircraft 1700 may further include an additional pair of servo motors 106. The wings 104 may each include a corresponding flap. The additional pair of servo motors 106 may be configured to control the flaps of each wing 104, to improve pitch and roll control.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An aircraft comprising:
   a fuselage defining a body frame with longitudinal, lateral and height axes extending perpendicular to each other and intersecting in a center of gravity of the aircraft; a pair of wings rotatably coupled, at wing roots, to opposing lateral sides of the fuselage, the pair of wings being rotatable relative to each other about a rotational axis which is at least substantially parallel to the lateral axis, and each wing having an airfoil with a leading edge and a chord;
   a pair of servo motors, each of which connected to a corresponding wing and configured to rotate the corresponding wing about its rotational axis in two rotational directions;

a pair of thrust motors, each of which mounted on a corresponding wing and configured to provide a thrust in a leading direction of the airfoil of the corresponding wing; and a flight controller connected to the pair of servo motors and to the pair of thrust motors, and configured to control each servo motor and each thrust motor, wherein each servo motor is able to rotate the corresponding wing about the rotational axis within such a rotational range that the aircraft can be selectively operated in a cruising mode, in which the pair of thrust motors provide thrust in a common direction so that the pair of wings are in a non-permanent-rotation-state about a yawing axis which is at least substantially perpendicular to the lateral axis and which extends at least substantially through the center of gravity, and a monocopter mode, in which the pair of thrust motors provide thrust in opposite directions so that the pair of wings are in a permanent-rotation-state about the yawing axis, the aircraft has a tailless configuration, and the flight controller is configured to perform active control of each servo motor and each thrust motor based on determining control parameters respectively for each servo motor and each thrust motor for at least controlling pitch and yaw of the aircraft for compensating for pitch and yaw instability due to the tailless configuration.

2. The aircraft of claim 1, wherein at least in the cruising mode the yawing axis is at least substantially the height axis.

3. The aircraft of claim 1, wherein in the monocopter mode, the fuselage is rotated at least substantially perpendicular relative to the chords of the wings such that the yawing axis is at least substantially the longitudinal axis.

4. The aircraft of claim 1, wherein the pair of wings are rotatable to be at least substantially 180° relative to each other such that the pair of thrust motors provide thrust in opposite directions.

5. The aircraft of claim 1, wherein each wing is rotatable by at least substantially 90° in an opposite direction to rotation of the other wing such that the pair of thrust motors provide thrust in opposite directions.

6. The aircraft of claim 1, wherein the wings are immovable relative to the fuselage, about the longitudinal and height axes.

7. The aircraft of claim 1, wherein each servo motor is coupled to the respective wing at a position proximal the wing root.

8. The aircraft of claim 1, wherein each thrust motor is mounted proximal to the leading edge of the airfoil of the respective wing.

9. The aircraft of claim 1, wherein each thrust motor is configured to provide thrust at least substantially parallel to the chord of the airfoil of the respective wing.

10. The aircraft of claim 1, wherein the rotational axis of the wings is collinear with the lateral axis of the aircraft.

11. The aircraft of claim 1, wherein the airfoil of each wing defines a corresponding center of gravity which is located at a distance of a quarter +/−5%, or +/−1%, of the length of the chord from the leading edge of the airfoil.

12. The aircraft of claim 1, wherein each thrust motor has a propeller rotatable about a central propeller axis, and is configured to rotate the propeller thereof about its central propeller axis in clockwise direction in both the cruising mode and the monocopter mode, and the wings, when in the monocopter mode, are configured to rotate in a clockwise direction about the yawing axis.

13. The aircraft of claim 1, wherein each motor has a propeller rotatable about a central propeller axis, and is configured to rotate the propeller thereof about its central propeller axis in counter-clockwise direction in both the cruising mode and the monocopter mode, and the wings, when in the monocopter mode, are configured to rotate in a counter-clockwise direction about the yawing axis.

14. The aircraft of claim 1, wherein the flight controller is further configured to control pitch and roll of the aircraft by controlling the pair of servo motors to rotate the corresponding wings about the rotational axis.

15. The aircraft of claim 1, wherein the flight controller is further configured to control yaw of the aircraft by controlling the pair of thrust motors.

16. The aircraft of claim 1, wherein the airfoil of each wing is a flat plate airfoil.

17. The aircraft of claim 1, wherein the airfoil of each wing is symmetrical about the chord of the wing.

* * * * *